(12) United States Patent
Nilsson

(10) Patent No.: US 11,317,171 B2
(45) Date of Patent: Apr. 26, 2022

(54) VIEWER IMPORTANCE ADAPTIVE BIT RATE DELIVERY

(71) Applicant: BRITISH TELECOMMUNICATIONS PUBLIC LIMITED COMPANY, London (GB)

(72) Inventor: Michael Nilsson, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 0 days.

(21) Appl. No.: 16/337,711

(22) PCT Filed: Sep. 29, 2017

(86) PCT No.: PCT/EP2017/074891
§ 371 (c)(1),
(2) Date: Mar. 28, 2019

(87) PCT Pub. No.: WO2018/060489
PCT Pub. Date: Apr. 5, 2018

(65) Prior Publication Data
US 2020/0045384 A1    Feb. 6, 2020

(30) Foreign Application Priority Data

Sep. 30, 2016 (EP) .................................... 16250016
Sep. 30, 2016 (EP) .................................... 16250017
Sep. 27, 2017 (GB) .................................... 1715668

(51) Int. Cl.
*H04N 7/173* (2011.01)
*H04N 21/845* (2011.01)
(Continued)

(52) U.S. Cl.
CPC ... *H04N 21/8456* (2013.01); *H04N 21/23439* (2013.01); *H04N 21/26258* (2013.01); *H04N 21/64769* (2013.01)

(58) Field of Classification Search
CPC ............. H04N 21/222; H04N 21/6405; H04N 21/44004; H04N 21/4331; H04N 21/8358; H04N 21/23439
(Continued)

(56) References Cited

U.S. PATENT DOCUMENTS 6,665,705 B1   12/2003  Daniels-Barnes
8,014,393 B1    9/2011  Faheem
(Continued)

FOREIGN PATENT DOCUMENTS

CN   101282479 A   10/2008
CN   101420618 A    4/2009
(Continued)

OTHER PUBLICATIONS

International Search Report for PCT/EP2017/074891 dated Dec. 4, 2017, 3 pages.
(Continued)

*Primary Examiner* — Jivka A Rabovianski
(74) *Attorney, Agent, or Firm* — Nixon & Vanderhye P.C.

(57) ABSTRACT

Examples of the present invention provide a method of delivering media, such as a video sequence, to a client device from a server, taking into account the relative importance of different portions of the video sequence. The sequence is divided into temporal segments, with each segment encoded at a plurality of bitrates (and hence qualities). A viewer importance parameter is assigned to each segment, indicating the relative importance of that segment, with the information stored in a manifest file or similar. The client receives this segment and viewer importance data in
(Continued)

a manifest file. As soon as the client is aware of a future segment marked as having higher viewer importance than the next segment for download, the client initiates the download of this further segment by making a request (e.g. HTTP request), while making a concurrent request for the delivery of the next segment.

17 Claims, 9 Drawing Sheets

(51) Int. Cl.
   *H04N 21/2343* (2011.01)
   *H04N 21/262* (2011.01)
   *H04N 21/647* (2011.01)

(58) Field of Classification Search
   USPC .................................................. 725/87, 116
   See application file for complete search history.

(56) References Cited

U.S. PATENT DOCUMENTS

| | | | |
|---|---|---|---|
| 8,135,040 B2 | 3/2012 | Cuijpers | |
| 8,514,891 B2 | 8/2013 | Green | |
| 8,850,055 B1 | 9/2014 | Mani et al. | |
| 8,887,214 B1 | 11/2014 | Black | |
| 9,219,940 B2 | 12/2015 | Gaillard | |
| 9,264,508 B2 | 2/2016 | Wolf | |
| 9,602,630 B2 | 3/2017 | LeFaucheur et al. | |
| 11,044,507 B2 | 6/2021 | Nilsson | |
| 2002/0166124 A1 | 11/2002 | Gurantz | |
| 2004/0148421 A1 | 7/2004 | Achtermann | |
| 2004/0210944 A1 | 10/2004 | Brassil | |
| 2004/0244058 A1 | 12/2004 | Carlucci | |
| 2008/0037420 A1 | 2/2008 | Tang | |
| 2008/0098420 A1 | 4/2008 | Khivesara | |
| 2009/0025027 A1 | 1/2009 | Craner | |
| 2009/0100489 A1 | 4/2009 | Strothmann | |
| 2009/0150943 A1 | 6/2009 | Vasudevan | |
| 2010/0086020 A1 | 4/2010 | Schlack | |
| 2010/0131969 A1 | 5/2010 | Tidwell | |
| 2010/0169916 A1 | 7/2010 | Stettner | |
| 2011/0096713 A1 | 4/2011 | Rusert | |
| 2011/0107379 A1 | 5/2011 | Lajoie | |
| 2011/0126248 A1 | 5/2011 | Fisher | |
| 2011/0188439 A1 | 8/2011 | Mao | |
| 2011/0197239 A1 | 8/2011 | Schlack | |
| 2011/0302320 A1 | 12/2011 | Dunstan | |
| 2012/0004960 A1* | 1/2012 | Ma ..................... | G06Q 30/0241 |
| | | | 705/14.4 |
| 2012/0140901 A1 | 6/2012 | Tennyson et al. | |
| 2012/0177101 A1 | 7/2012 | Van der Schaar | |
| 2012/0331106 A1 | 12/2012 | Ramamurthy | |
| 2012/0331513 A1 | 12/2012 | Yamagishi | |
| 2013/0007226 A1 | 1/2013 | White | |
| 2013/0091521 A1 | 4/2013 | Phillips | |
| 2013/0097309 A1* | 4/2013 | Ma ..................... | H04L 29/08099 |
| | | | 709/224 |
| 2013/0103849 A1 | 4/2013 | Mao | |
| 2013/0160047 A1 | 6/2013 | Dubose | |
| 2014/0020037 A1 | 1/2014 | Hybertson | |
| 2014/0143823 A1 | 5/2014 | Manchester | |
| 2014/0241415 A1 | 8/2014 | Su et al. | |
| 2014/0241419 A1 | 8/2014 | Holmer | |
| 2014/0282777 A1 | 9/2014 | Gonder | |
| 2014/0282784 A1 | 9/2014 | Pfeffer | |
| 2014/0282792 A1* | 9/2014 | Bao ................... | H04N 21/44004 |
| | | | 725/116 |
| 2014/0359076 A1 | 12/2014 | Wan | |
| 2016/0044080 A1* | 2/2016 | DuBreuil ........... | H04N 21/6405 |
| | | | 709/219 |
| 2016/0065441 A1 | 3/2016 | Besehanic | |
| 2016/0134673 A1 | 5/2016 | MacInnis | |
| 2016/0286247 A1 | 9/2016 | Phillips | |
| 2018/0027039 A1 | 1/2018 | Moorthy | |
| 2019/0124375 A1 | 4/2019 | Lundberg | |
| 2020/0037012 A1 | 1/2020 | Nilsson | |
| 2020/0037017 A1 | 1/2020 | Nilsson | |
| 2020/0045384 A1 | 2/2020 | Nilsson | |

FOREIGN PATENT DOCUMENTS

| | | |
|---|---|---|
| CN | 101494785 A | 7/2009 |
| CN | 103814562 | 5/2014 |
| CN | 104096362 A | 10/2014 |
| CN | 104219524 A | 12/2014 |
| EP | 2 566 064 | 3/2013 |
| WO | 2012/018288 | 2/2012 |
| WO | 2012/018289 | 2/2012 |
| WO | 2013/004260 | 1/2013 |
| WO | 2013/044025 | 3/2013 |
| WO | 2015/051846 | 4/2015 |
| WO | 2018/060488 | 4/2018 |
| WO | 2018/060489 | 4/2018 |
| WO | 2018/060490 | 4/2018 |

OTHER PUBLICATIONS

Office Action dated Nov. 17, 2020 issued in U.S. Appl. No. 16/337,641 (10 pgs.).
U.S. Appl. No. 16/337,500, filed Mar. 28, 2019, Viewer Importance Adaptive Bit Rate Delivery.
U.S. Appl. No. 16/337,642, filed Mar. 28, 2019, Viewer Importance Adaptive Bit Rate Delivery.
U.S. Appl. No. 16/337,711, filed Mar. 28, 2019, Viewer Importance Adaptive Bit Rate Delivery.
International Search Report for PCT/EP2017/074890 dated Dec. 4, 2017, 3 pages.
International Search Report for PCT/EP2017/074893 dated Dec. 4, 2017, 3 pages.
Office Action dated Jun. 9, 2020, issued in U.S. Appl. No. 16/337,641 to Nilsson, filed Mar. 28, 2019 (9 pages).
Office Action dated Jun. 23, 2020, issued in U.S. Appl. No. 16/337,500 to Nilsson filed Mar. 28, 2019 (11 pages).
Office Action dated Jun. 3, 2021 issued in Chinese Application No. 201780059581.8 (6 pages).
Office Action dated Sep. 30, 2020 issued in Chinese Application No. 201780059978.7 (9 pages) and Translation (12 pages).
Office Action dated Nov. 2, 2020 issued in Chinese Application No. 201780060188.0 (10 pages).
Office Action dated Oct. 10, 2020 issued in Chinese Application No. 201780059581.8 (11 pages).
Examination Report issued in EP Application No. 17778259.6, dated Sep. 24, 2021, 6 pages.
Examination Report issued in GB 1705286.1, dated Jul. 26, 2021, 5 pages.
Office Action issued in EP Application No. 17780371.5, dated Sep. 23, 2021, 6 pages.
Office Action issued in CN201780059978.7, dated Jun. 15, 2021, with English Translation, 15 pages.

\* cited by examiner

VIEWER IMPORTANCE ADAPTIVE BIT RATE DELIVERY

This application is the U.S. national phase of International Application No. PCT/EP2017/074891 filed Sep. 29, 2017 which designated the U.S. and claims priorities to EP 16250016.9 filed Sep. 30, 2016, EP 16250017.7 filed Sep. 30, 2016, and GB 1715668.8 filed Sep. 27, 2017, the entire contents of each of which are hereby incorporated by reference.

FIELD OF THE INVENTION

This invention relates to the field of media delivery over a network, in particular to a method of delivering media to a client device taking into account viewer importance.

BACKGROUND TO THE INVENTION

Adaptive bit rate delivery is becoming more and more common for unicast delivery of video content, using proprietary techniques including Apple HTTP Live Streaming (HLS) and Microsoft SmoothStreaming, and using the standardised MPEG DASH (Dynamic Adaptive Streaming over HTTP) protocol.

Adaptive bit rate streaming is based on the concept of dividing the content into short segments, typically 4 to 10 s in duration, encoding each segment at a number of different bit rates (and hence different qualities), and for the client device to retrieve the content using HTTP GET requests. The bit rate (quality) of the segment requested is determined based on the throughput recently achieved over the network, and the amount of data already delivered and buffered at the client device awaiting display.

Current implementations of adaptive bit rate delivery treat all segments equally. Consequently, some segments might be delivered at a quality (bit rate) acceptable to the viewer, but other segments at a quality unacceptable to the viewer.

SUMMARY OF THE INVENTION

It is the aim of embodiments of the present invention to provide an improved method of delivering media to a client device.

According to one aspect of the present invention, there is provided a method of delivering video content to a client device from a server, said video content comprising a sequence of segments and wherein each of the segments is encoded at a plurality of bit rates, said method comprising: receiving information at the client device about each segment, wherein the information comprises the bit rates and a viewer importance parameter associated with each segment; identifying a first segment from the sequence of segments for delivery;
identifying a further segment after the first segment from the sequence of segments, wherein the further segment has an associated viewer importance parameter that is higher than the viewer importance parameter associated with the first segment;
delivering the identified first segment concurrently with the identified further segment, wherein the identified further segment is encoded at a bit rate that is equal to or higher than the identified first segment.

The method may further comprise:
determining the network bit rate between the server and client device; and
deciding on a proportion of the network bit rate to make available for delivery of the identified further segment; and determining the bit rate of the first segment and the bit rate of the further segment in dependence on the network bit rate and proportion.

Determining the bit rate of the first segment and the bit rate of the further segment may be further in dependence on a specified time to complete delivery of the further segment.

Delivering the identified first segment concurrently with the identified further segment may comprise making requests for the identified first segment concurrently with the identified further segment.

The information about each segment may be received in a manifest file.

It is important to recognise that examples of the invention relate to prioritisation of segments, to try to ensure that the segments of most interest to the viewer are delivered at a higher quality. Segments have an associated viewer importance parameter indicative of the relative importance of that segment, and delivery of a segment is effectively prioritised according to its relative viewer importance.

Examples of the invention are not about generic data traffic prioritisation where one flow is prioritised over another, either because the flow as a whole is more valuable or more time sensitive, or because a particular flow is close to exhaustion, which could cause play-out to stall. It is also not about ensuring a more demanding flow (e.g. a sports program) achieves a higher network throughput than a less demanding flow (e.g. a drama program).

One the example is with some sports events, where short periods of most interest are separated by longer periods of less interest. For example, in baseball and cricket, the short period of time starting from just before the pitcher/bowler releases the ball is of great interest to the viewer, but lasts only a few seconds, whereas there is a period leading up to the next such event which is of considerably less interest. Examples are clearly not limited to sports content, but also include, but are not limited to, game shows, reality TV, drama and news.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention provide a method of delivering media, such as a video sequence, to a client device from a server, taking into account the relative importance of different portions of the video sequence. The sequence is divided into temporal segments, with each segment encoded at a plurality of bitrates (and hence qualities). A viewer importance parameter is assigned to each segment, indicating the relative importance of that segment, with the information stored in a manifest file or similar. The client receives this segment and viewer importance data in a manifest file. As soon as the client is aware of a future segment marked as having higher viewer importance than the next segment for download, the client initiates the download of this further segment by making a request (e.g. HTTP request), while making a concurrent request for the delivery of the next segment.

Figure 1:
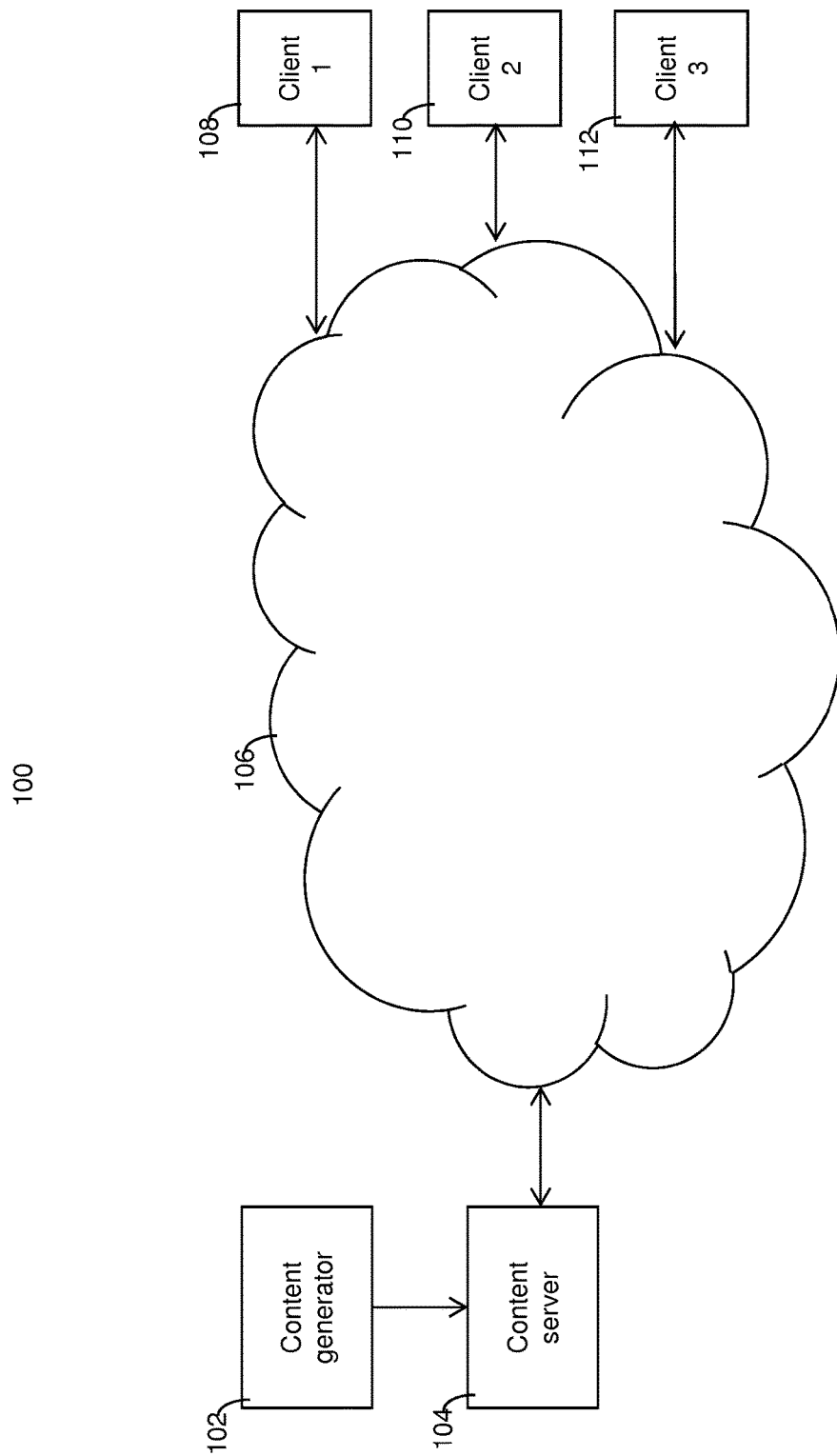
FIG. 1 is a network diagram showing a system in an example of the present invention.

FIG. 1 is a simplified network diagram showing a system 100 comprising a content generator 102 communicating with a content server 104. The content generator 102 is responsible for receiving uncompressed video content, such as live TV, and encoding and packaging the video content to pass to the content server 104. The content server 104 is responsible for storing the received video content, and, on request, delivering the content to suitably configured clients connected over the network 106. In this example, three client devices 108, 110 and 112 are shown. The clients may be standard HTTP Adaptive Bit Rate streaming clients, adapted to support MPEG DASH or Apple's HLS for example. The clients are adapted to discover video content, request and process manifest files, request segments of video, and process those segments for viewing. Whilst video content can be delivered over the network 106 directly to these clients, delivery could instead be made via a proxy local to each client.

The content generator 102 includes a mechanism for inserting metadata into the manifest files that it generates, the metadata including data signalling, for each segment of encoded content, a viewer importance parameter indicative of the importance of the content, represented by the encoded video and audio data in the segment, to the end user.

It should be noted that the term "importance" and "interest" are used interchangeably in the description. Thus references to a viewer importance parameter are intended to be equivalent to a viewer interest parameter.

Figure 2:
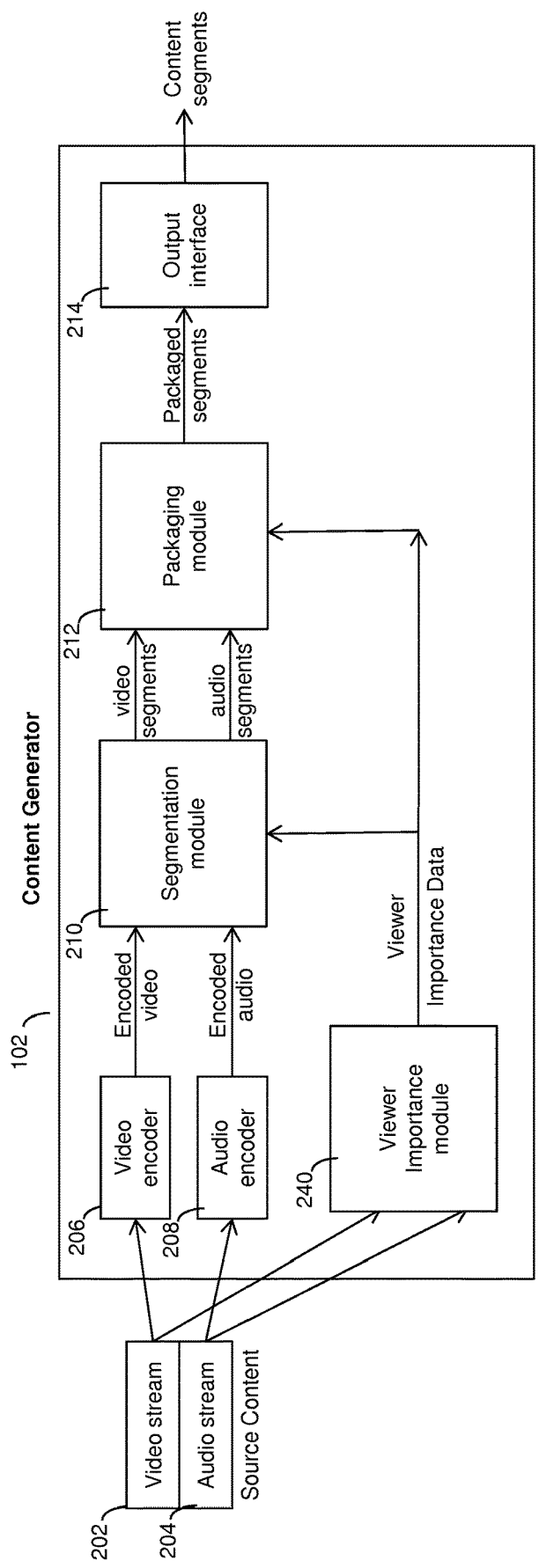
FIG. 2 is a block diagram of a content generator in an example of the invention.

The content generator 102 is shown in more detail in FIG. 2. The content generator 102 comprises a video encoder 206, an audio encoder 208, a segmentation module 210, a packaging module 212, and an output interface 214. Uncompressed video content comprising an uncompressed video stream 202 and an uncompressed audio stream 204 are received by the content generator 102. Specifically, the video encoder 206 takes the uncompressed video stream 202, and encodes the video to generate an encoded video stream. In this example, the video encoding method used is in accordance with the ITU-T H.264 standard, though the invention is not limited to such a standard, and other encoding methods could be used instead. Similarly, the audio encoder 208 takes the uncompressed audio stream 204, and encodes the audio to generate an encoded audio stream. In this example, the audio encoding method is MPEG-4 HE AAC v2, though the invention is not limited to such a standard, and other encoding methods could be used instead. The uncompressed video stream is encoded at multiple bit rates (the associated uncompressed audio stream is usually only encoded at one bit rate, but may also be encoded at multiple bit rates), thus generating an encoded stream for each bit rate. The different bit rates effectively result in different video qualities, with higher bit rate encoding resulting in higher video quality and lower bit rate resulting in lower video quality. The encoded video stream comprises a plurality of frames or pictures, which in turn can be clustered into groups of pictures or GOPs.

The encoded video stream and encoded audio stream (or each encoded video and audio steam if the content was encoded at multiple bit rates) are segmented by the segmentation module 210 into discrete (video and audio) temporal segments. It is envisaged that each temporal segment is equivalent to between 2 and 15 seconds in duration of the uncompressed video/audio, though longer or shorter durations could be used. Whilst the segmentation module 210 is shown as operating after the encoders 206 and 208, the segmentation can be performed on the uncompressed video and audio streams prior to their encoding. Thus, the uncompressed video and audio can first be segmented, and then the resulting uncompressed segments can be encoded to generate the encoded video and audio segments.

The segmentation module 210 may select the segment duration taking into account service requirements. For example, shorter segments allow switching between streams with different encoded bit rates to occur quicker, and would allow viewer importance data to be signalled with finer time-based granularity. However, longer segments are more easily processed by system components, particularly by CDN (Content Delivery Network) nodes, but may negatively impact the frequency with which changes to viewer importance data could be signalled, and could cause slower switches between encoded bit rates and may introduce more end-to-end latency for live services. By selecting the duration for each segment rather than using a fixed value, it would be possible to choose segment durations, and hence segment boundaries, such that they aligned with changes in viewer importance data, thus enabling both nominally long segment durations and fine granularity of signalling viewer importance data.

The video and audio segments are handled by the packaging module 212. In some embodiments the output of the packaging module 212 is in a so-called multiplexed format, such as the MPEG-2 Transport Stream as specified in IS 13818-1. MPEG-2 transport streams are often used for delivery of digital television in real time. Segments of MPEG-2 transport streams are also used in Apple's HLS. In other embodiments, the output of the packaging module could be in a so-called non-multiplexed format, such as the ISO Base Media File Format, as specified in IS 14496-12. Segments in this format are referred to as MP4 fragments.

A person skilled in the art will appreciate that the functions performed by the encoders, segmentation module and packaging module can be performed by a single, suitably configured, general video encoder module.

The packaging module 212 also generates a manifest file, which describes the encoded content (the transport stream segments in this example) and how it can be obtained, and passes this file to the content server 104. When using MPEG-DASH, IS 20009-1, the manifest file is referred to as an MPD (Media Presentation Description). Apple's HLS provides a manifest file in the form of a playlist file (.m3u8 file). The manifest file includes data, for each content segment, a viewer importance parameter indicative of the importance of the segment to viewer.

This viewer importance parameter, also referred to as viewer importance data, can be generated by a viewer importance module 240 using the uncompressed video stream 202 and/or the uncompressed audio stream 204.

In one example, the viewer importance data could be derived from the loudness of the audio stream, with, for example, louder audio being indicative of greater viewer importance. In another example, the viewer importance data could be derived from the video stream, with viewer importance data being derived from one or more of: the amount of movement with the video stream, the rate of scene changes within the stream, and by matching the pictures of the video stream to a pre-determined picture.

Figure 3:
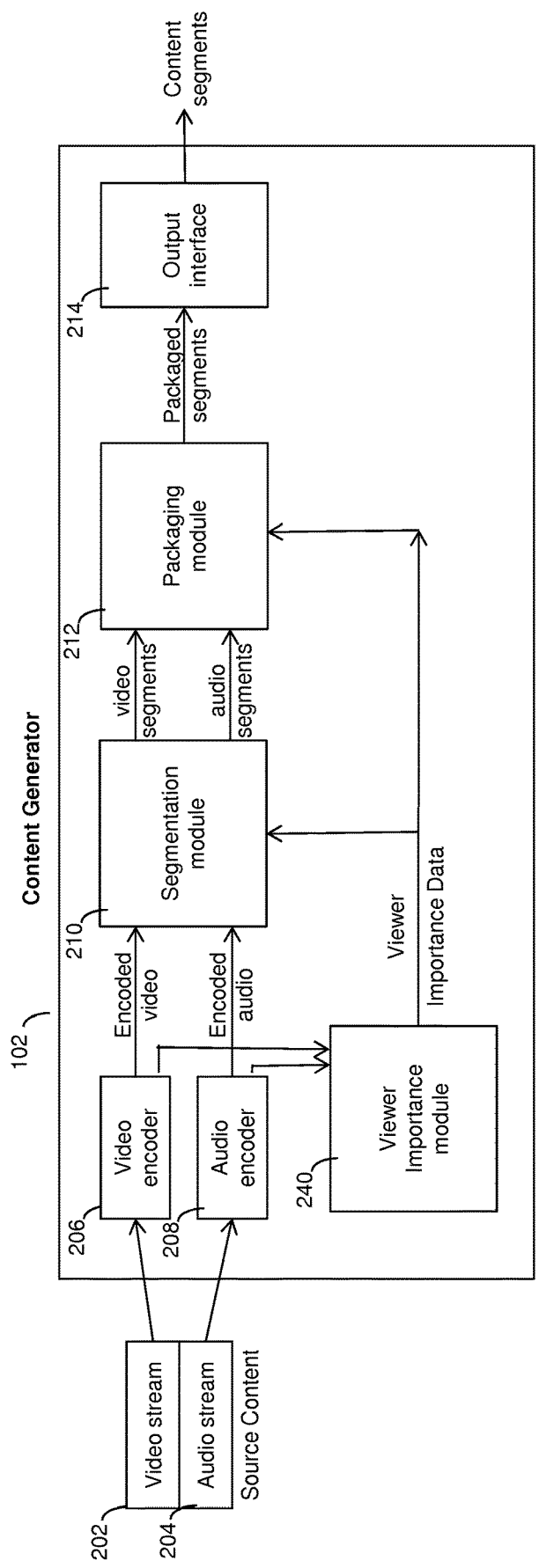
FIG. 3 is a block diagram of a content generator in another example of the invention.

As shown in FIG. 3, the viewer importance data can be generated by a viewer importance module 240 using information generated by encoding the uncompressed video stream 202 in the video encoder 206 and/or using information generated by encoding the uncompressed audio stream 204 in the audio encoder 208. In one example, the viewer importance data can be derived from the loudness or the audio frequencies that are present in the audio stream. In another example, the viewer importance data can be derived from the video encoding process, with viewer importance data being derived from one or more of: the magnitude of motion vectors with the video stream, the rate at which intra frames are encoded, and the complexity of the video stream, calculated from the quantisation parameters used in encoding and the resulting number of compressed bits.

Figure 4:
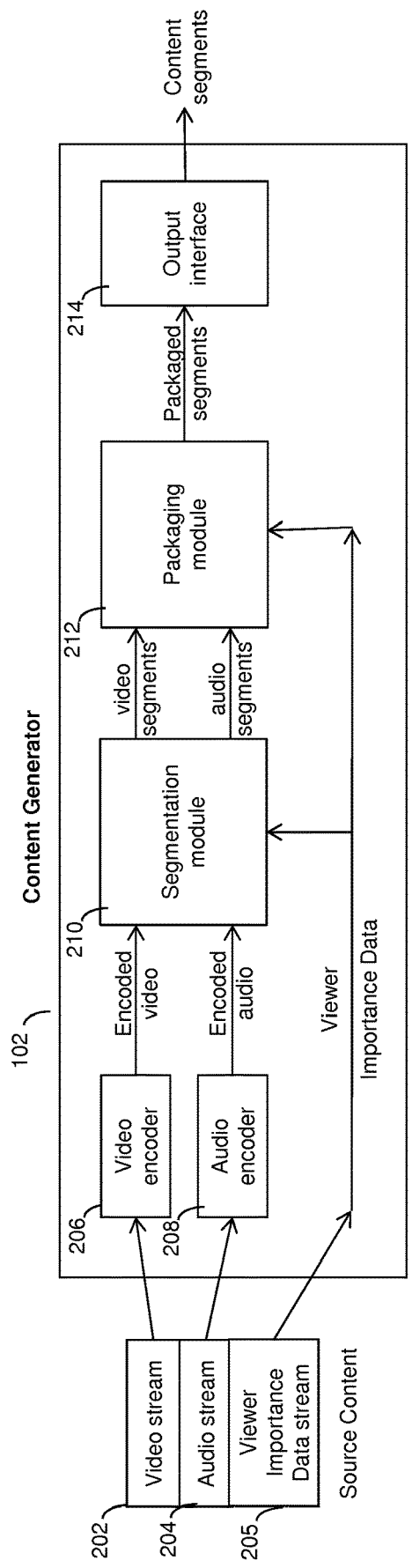
FIG. 4 is a block diagram of a content generator in another example of the invention.

As shown in FIG. 4, the viewer importance data can be generated by a process that occurs before the content generator 102 receives the source content, in which case a viewer importance data stream, 205, is input to the content generator along with an uncompressed video stream 202 and an uncompressed audio stream 204. In this case, the viewer importance data could have been generated by an automatic process during content capture. For example, at a sports event, content captured from some cameras may be considered to be of higher importance to the viewer than that from other cameras. Alternatively, the content may be manually annotated to indicate varying levels of importance to the viewer. Such manual annotation may be integrated with existing content capture and production workflows, where content is annotated during capture to enable content to be replayed for the benefit of the viewer, or for the later generation of a highlights package or for discussion during a natural break in the event.

The segmentation module 210 may select the segment duration taking into account the viewer importance data, and in particular, align segment boundaries with changes, or significant changes, in the viewer importance data.

In one example, the packaging module 212 receives the viewer importance data, and includes this data within the manifest file that it generates. The manifest file describes the available bit rates for each segment of content, and where each is located (an address of the location where the segment is stored in the content server 104). The manifest file is used by a client to select and request content segments, with the client selection of which encoded content segment, and at which encoded bit rate, to request being dependent at least on the viewer importance data (or viewer importance parameter) associated with the segments.

In another embodiment, the packaging module 212 receives the viewer importance data, and includes this data within the content segments that it produces, signalling in one content segment the viewer importance data for at least one future content segment.

Figure 5:
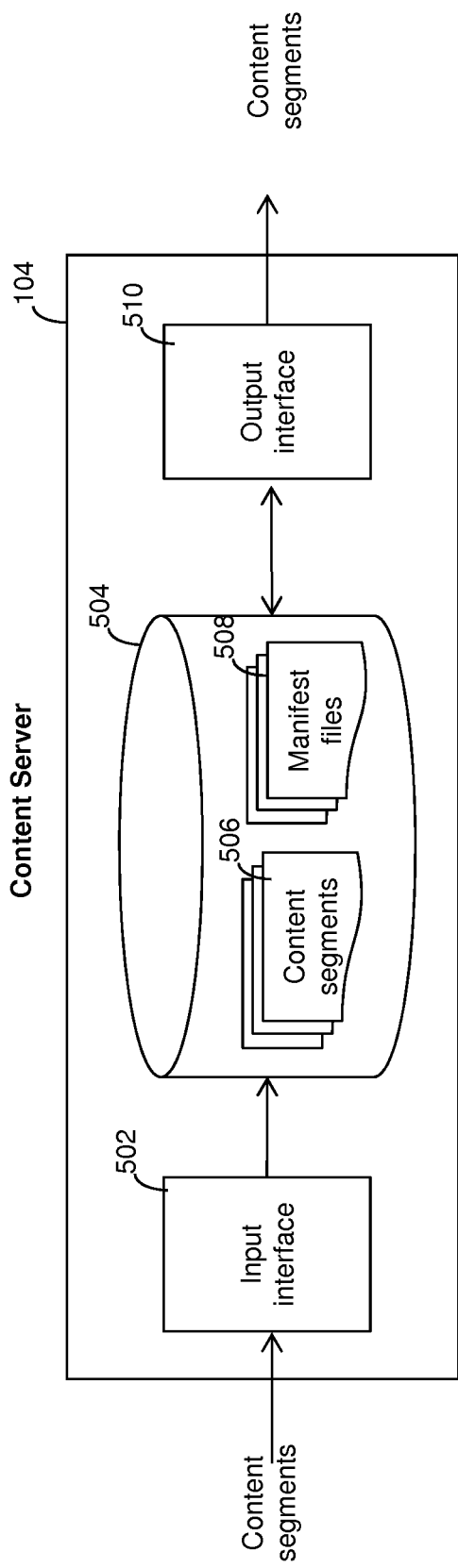
FIG. 5 is a block diagram of a content server in an example of the invention.

The content server 104 is shown in more detail in FIG. 5. The content server 104 receives the encoded content segments, at an input interface 502, in the form of, for example, transport stream segments or fragments of an MP4 file and any associated manifest file, from the content generator 102.

The content server 104 further comprises a data store 504 for storing content segments 506 and manifest files 508, and an output interface 510. The data store 504 may form part of a standard web server, which is able to serve individual content segments in response to requests via the output interface 510. Content segments are provided by the content server 104 in response to requests by clients.

Figure 6:
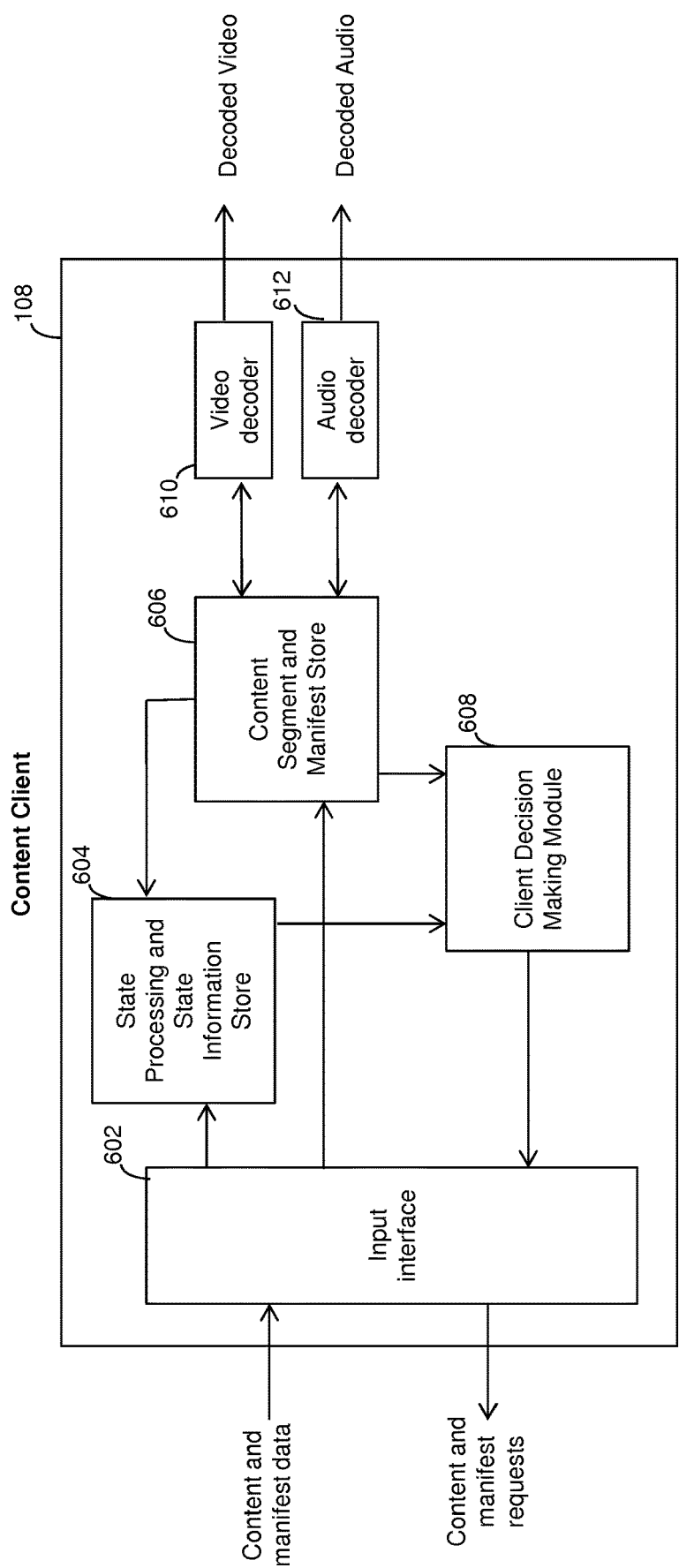
FIG. 6 is a block diagram of a content client in an example of the invention.

A client 108 is shown in more detail in FIG. 6. The client 108 can initiate content delivery by first making a request to the content server 104 for the appropriate manifest file associated with the desired content. After receiving and processing the manifest file, the client can make specific requests for encoded content segments, using the location information associated with each segment in the manifest file, making decisions as to which segment and at which encoded bit rate, to request, using the metadata contained within the manifest file, and state information that it has calculated and stored.

After making a request for a manifest file, and receiving the manifest file from the content server 104 on input interface 602, the content client 108 stores the manifest file in the content segment and manifest store 606. The client decision making module 608 analyses the manifest file and issues a request for a content segment at a specified encoded bit rate or quality level, using the location information in the manifest file. The request is passed by the content client 108 through the input interface 602 to the content server 104. When the requested segment, and any subsequent segments, are received on input interface 602 from the content server 104, the content segments are stored in the content segment and manifest store 606.

The received and stored content segments are passed to the video decoder 610 and audio decoder 612, which perform decoding operations and output decoded video and audio respectively. When a content segment has been decoded and presented to the user, it is removed from the content segment and manifest store 606. Thus, the content segment and manifest store 606 acts as a buffer for the received segments until they are retrieved by the decoders for decoding and playback.

The state processing and state information store 604 monitors the rate at which content data is received on the input interface 602, the rate at which content is decoded and presented to the user via video decoder 610 and audio decoder 612, and the amount of content segment data that is received and stored in the content segment and manifest store 606, but not yet decoded and presented to the user.

The client decision making module 608 processes the metadata in the manifest file and the state information that has been calculated and stored in the state processing and state information store 604, to determine which content segment at which encoded bit rate or quality level to request from the content server 104 next. It then issues a request for that content segment on the input interface 602 to the content server 104.

In one example, the content requests take the form of HTTP requests for each segment, which are processed by the content server 104 to deliver content to the client 108. In some embodiments, each single content request results in a single content segment being delivered, whereas in other embodiments, a single content request may result in a multiple content segments being delivered using the HTTP PUSH protocol.

The metadata included in the manifest file may include, but is not limited to: the bit rate of each segment; the duration of each segment; and the viewer importance of each segment. Each of these data items may be different for each segment within an entire piece of content, such as a movie, or may remain constant for longer durations or the entire piece of content. In one example, the bit rate is the same for each encoded segment at a given quality level, this being so-called constant bit rate encoding. In another embodiment the bit rate may be different for each encoded segment at a given quality level, such that the perceptual quality of each segment, at the given quality level, is approximately constant, this being so-called constant quality encoding. The duration of each segment can be constant, or the segment duration can be variable, including the example where the boundaries of the segments align with changes in the viewer importance data. In general, the viewer importance data would be expected to vary between segments, but for some pieces of content there may be no or little variation.

The state information calculated and stored in the state processing and state information store 604 may include, but is not limited to: the amount of data that has already been received but not yet presented to the user, measured in any suitable units, for example in terms of presentation time to the user or stored data in terms of bytes; and an estimate of the network bit rate (throughput) the client has been able to achieve from the content server 104, measured over at least one time period.

As stated above, a manifest file is used to describe the available bit rates for each segment of content, and where each is located (the file location). When MPEG DASH, IS 23009-1, is used, the manifest file is an XML file known as a Media Presentation Description (MPD). When Apple HTTP Live Streaming (HLS) is used, the manifest file is a playlist file in .m3u8 format. When Microsoft Smooth-Streaming is used, the manifest file is an XML file.

Examples of Apple HLS manifest files will now be described, followed by Apple HLS manifest files carrying viewer importance information in accordance with an example of the invention. The viewer importance information can also be carried in other manifest file formats using appropriate syntax.

With Apple HLS, there is a hierarchy of .m3u8 files that provide the information to a client about the content, with a master playlist file referencing a number of individual playlist files. The following is an example of a master playlist file:

```
#EXTm3U
#EXT-X-STREAM-INF:BANDWIDTH=1300000
http://example.com/content_at_1M3.m3u8
#EXT-X-STREAM-INF:BANDWIDTH=2000000
http://example.com/content_at_2M0.m3u8
#EXT-X-STREAM-INF:BANDWIDTH=3000000
http://example.com/content_at_3M0.m3u8
#EXT-X-STREAM-INF:BANDWIDTH=4500000
http://example.com/content_at_4M5.m3u8
```

This master playlist file makes reference to four further playlist files: content_at_1M3.m3u8, content_at_2M0.m3u8, content_at_3M0.m3u8, and content_at_4M5.m3u8. Each of these playlist files can be found at http://example.com/, and reference content that has been encoded at 1.3 MBit/s, 2.0 MBit/s, 3.0 MBit/s, and 4.5 MBit/s respectively, as indicated by the bandwidth attribute.

Each of these four playlist files can describe the whole of the video content item, such as a movie, by listing all of the segments that represent that content item, encoded at the respective bit rate. This usage would be typical for a video on demand application, where the whole content item is available on the content server at the time the client initiates playing it.

The following is an example of such a playlist file, content_at_3M0.m3u8.

```
#EXTM3U
#EXT-X-PLAYLIST-TYPE:VOD
#EXT-X-TARGETDURATION:10
#EXT-X-VERSION:3
#EXT-X-MEDIA-SEQUENCE:1
#EXTINF:10.0,
Segment_3M0_0001.ts
#EXTINF:10.0,
Segment_3M0_0002.ts
#EXTINF:10.0,
Segment_3M0_0003.ts
...
#EXTINF:10.0,
Segment_3M0_0719.ts
#EXTINF:9.0,
Segment_3M0_0720.ts
#EXT-X-ENDLIST
```

The playlist file consists of a total of 720 segments, with all except the last having duration 10 s, and the last having duration 9 s (the duration indicated by the #EXTINF parameter). As the playlist details all the segments that make up the content, a client need only request this type of playlist file once to be able to play the whole content item.

Alternatively, each of these four playlist files may describe only a small number of segments, perhaps four ten second segments. This usage would be typical for a live content delivery service, such as the live delivery of a television program, where the segments in the playlist represent the most recent segments closest to the "live edge" of the program. The client would repeatedly request the playlist file, typically at intervals approximately equal to the segment duration. Each time the returned playlist file may contain different (newer) segments.

The following is an example of one playlist file that a client may receive in such a live delivery arrangement.

```
#EXTM3U
#EXT-X-TARGETDURATION:10
#EXT-X-VERSION:3
#EXT-X-MEDIA-SEQUENCE:120
#EXTINF:10.0,
Segment_3M0_0120.ts
#EXTINF:10.0,
Segment_3M0_0121.ts
#EXTINF:10.0,
Segment_3M0_0122.ts
#EXTINF:10.0,
Segment_3M0_0123.ts
```

This playlist shows four segments are available for download, numbered 120 to 123. Segment 120 is the oldest segment of content, whereas segment 123 is the newest and the segment closest to the 'live edge' of the content.

If the client requests the playlist again after about 10 s, it is likely to receive a slightly different playlist file as new content may be available. An example is shown below, where the oldest listed segment is now number 121, and a new segment 124 is available.

```
#EXTM3U
#EXT-X-TARGETDURATION:10
#EXT-X-VERSION:3
#EXT-X-MEDIA-SEQUENCE:121
#EXTINF:10.0,
Segment_3M0_0121.ts
#EXTINF:10.0,
Segment_3M0_0122.ts
#EXTINF:10.0,
Segment_3M0_0123.ts
#EXTINF:10.0,
Segment_3M0_0124.ts
```

There now follows examples of playlist files incorporating viewer importance data.

The following shows the above video on demand playlist file extended to provide information about which segments are likely to be of most interest to the viewer of the content.

```
#EXTM3U
#EXT-X-PLAYLIST-TYPE:VOD
#EXT-X-TARGETDURATION:10
#EXT-X-VERSION:3
#EXT-X-MEDIA-SEQUENCE:1
#EXTINF:10.0,
#EXT-X-VIEWER-INTEREST:1
Segment_3M0_0001.ts
#EXTINF:10.0,
#EXT-X-VIEWER-INTEREST:2
Segment_3M0_0002.ts
#EXTINF:10.0,
#EXT-X-VIEWER-INTEREST:1
Segment_3M0_0003.ts
...
#EXTINF:10.0,
#EXT-X-VIEWER-INTEREST:2
Segment_3M0_0719.ts
#EXTINF:9.0,
#EXT-X-VIEWER-INTEREST:1
Segment_3M0_0720.ts
#EXT-X-ENDLIST
```

In this example playlist file, each segment has an additional parameter indicated by the prefix #EXT-X-VIEWER-INTEREST. It can be seen that segments numbered 1, 3 and 720 have value 1, indicative of lower viewer interest, and segments 2 and 719 have value 2, indicative of higher viewer interest. For example, segment 2 may be of interest to the viewer as it represents an important part of the movie plot at the start of the movie, and similarly segment 719 might have been marked as being of higher interest to the viewer because it represents some conclusive action at the end of the movie. Segment 720 might have been marked as being of lower interest to the viewer because it represents credits at the end of the movie.

The following is an example of the live playlist file, derived from the first requested live playlist file described above.

```
#EXTM3U
#EXT-X-TARGETDURATION:10
#EXT-X-VERSION:3
#EXT-X-MEDIA-SEQUENCE:120
#EXTINF:10.0,
#EXT-X-VIEWER-INTEREST:1
Segment_3M0_0120.ts
#EXTINF:10.0,
#EXT-X-VIEWER-INTEREST:1
Segment_3M0_0121.ts
#EXTINF:10.0,
#EXT-X-VIEWER-INTEREST:1
Segment_3M0_0122.ts
#EXTINF:10.0,
#EXT-X-VIEWER-INTEREST:1
Segment_3M0_0123.ts
```

In this example it can be seen that all listed segments are given a lower level of viewer interest.

The following is an example of the live playlist file, derived from the second requested playlist file, requested about ten seconds after the first requested playlist file immediately above.

```
#EXTM3U
#EXT-X-TARGETDURATION:10
#EXT-X-VERSION:3
#EXT-X-MEDIA-SEQUENCE:121
#EXTINF:10.0,
#EXT-X-VIEWER-INTEREST:1
Segment_3M0_0121.ts
#EXTINF:10.0,
#EXT-X-VIEWER-INTEREST:1
Segment_3M0_0122.ts
#EXTINF:10.0,
#EXT-X-VIEWER-INTEREST:1
Segment_3M0_0123.ts
#EXTINF:10.0,
#EXT-X-VIEWER-INTEREST:2
Segment_3M0_0124.ts
```

The segments numbered 121, 122, and 123 are again indicated to be of lower interest to the viewer, but segment numbered 124 is indicated to be of higher interest to the viewer. This may be because the content item represents a sports event in which there are periods of action separated by periods building up to the next piece of action, or next 'play'. Segment 124 may represent such a period of action, and hence would be of higher interest to the viewer than the period of time leading up to it.

In the case of the video on demand playlist, the whole of the content item is described to the client when the manifest file is first retrieved, and the client can plan when to request segments and at what quality to request them at any time from the start of playing, up to the time that the segments are needed for decoding and presenting media.

However, in the case of the live playlist, the client only has visibility of the level of interest to the viewer of each segment for a short period of time before that segment is needed for decoding and presenting media. This live case is more challenging to deal with, and is the basis for the illustration of client behaviour below. Whilst the illustration is described with reference to the live scenario, the approach can also be applied to the video on demand scenario.

To recap, in the implementation with live content, the manifest file must be repeatedly requested to obtain new information about segments recently made available on the content server.

In this example, the content segments are encoded at four constant bit-rates, all having the same duration, equal to 10 s. The four bit-rates are 1.3 MBit/s, 2.0 MBit/s, 3.0 MBit/s, and 4.5 MBit/s. The client makes regular requests for updates of the manifest file. This is common behaviour for Apple HLS, particularly when used for live streaming. In this case, each request for the manifest file may result in a slightly different manifest file, detailing different content data that is now available. For example, when the client is requesting an update to the manifest file at intervals approximately equal to the segment duration, each new manifest file will typically have an additional segment listed that has recently become available, and one oldest segment that is no longer listed, as it is too far from the 'live edge' of the live content.

As described earlier, the client will request a manifest file, and will then determine which segment to request next and at which quality. Described now will be the client behaviour from an arbitrary point during the playing of a piece of content.

The following table shows, in abbreviated form, the information returned in successive requests for the manifest or playlist file, for a single encoded bit rate. Each column shows a list of segment numbers and an associated viewer importance value. Similar information would be returned in requests for the playlist file for alternative encoded bit rates. This table therefore presents an abbreviated form of the playlists described above.

TABLE 1

| First playlist file requested | Second playlist file requested | Third playlist file requested | Fourth playlist file requested |
|---|---|---|---|
| 120, 1 | 121, 1 | 122, 1 | 123, 1 |
| 121, 1 | 122, 1 | 123, 1 | 124, 2 |
| 122, 1 | 123, 1 | 124, 2 | 125, 1 |
| 123, 1 | 124, 2 | 125, 1 | 126, 1 |

The first playlist returned in this example, which could be at the start of playback, but we assume instead that it is at some arbitrary point during playback, lists segments numbered 120 to 123, and all having viewer importance parameters equal to 1, indicative of a lower level of importance to the viewer.

The second playlist returned lists segments numbered 121 to 124, with the first three having viewer importance parameters equal to 1, indicative of a lower level of importance, and the last, segment 124, having viewer importance equal to 2, indicative of a higher level of importance.

Similarly the third and fourth playlist files introduce new segments, which in this example, have segment numbers 125 and 126 and which have viewer importance parameters equal to 1, indicative of a lower level of importance.

Therefore, it is only on receiving the second playlist file that the client becomes aware of a forthcoming higher importance segment. At this point, the client has the opportunity to plan ahead to try to ensure that the higher importance segment is obtained at an adequate quality level i.e. bit rate.

There now follows an example of a method used by the client to download segments, but without taking into account the viewer importance parameter. The client can use the method to make decisions about the content segment to request next and at which quality.

The example starts when the client is part way through downloading, and has some content already buffered ready to decode and playout. For convenience, the time when the next playlist file, being the first playlist file in Table 1 above, is delivered from the content server to the client is described as time zero.

Initially, the client makes a request for the manifest file, the information in which is summarised in Table 1, with each segment available at 4 different bit rates: 1.3 MBit/s, 2.0 MBit/s, 3.0 MBit/s and 4.0 Mbit/s. The client state processing and state information store 604 monitors the rate at which content data has been received on the input interface 802. The client decision making module 608 uses this rate information to estimate of the available network bit rate (or throughput), for example as equal to a running average of the rate at which data has been received over a given period of time.

The client state processing and state information store 604 also monitors the amount of content segment data that has been received and stored in the content segment and manifest store 606, but not yet decoded and presented to the user. This amount of data can be viewed as the duration of the buffered content.

The client decision making module 608 uses the duration of the buffered data to calculate the time available for downloading the next segment. This is defined as follows:

$$\text{Time available to download} = (\text{Duration of buffered data}) + (\text{next segment duration}) - (\text{minimum buffer duration}) \quad (1)$$

The next segment duration is the duration of the next segment that is to be downloaded, which once downloaded will contribute to the duration of buffered data. The minimum buffer duration sets out a duration of data for the client buffer to attempt to avoid buffer underflow and content playback stalling that might occur when there are fluctuations in the network bit rate. However, too large a buffer duration will lead to large amounts of data being buffered, and playback to run significantly later than the 'live edge', that is, presentation to the user will be a significant amount of time after the live event.

For example, if the duration of the buffered data is 16 seconds, the next segment duration is 10 seconds, and the minimum buffer duration is 15 seconds. The time available for download is 11 seconds (16+10-15). This can also be viewed as follows. Suppose that initially 16 s of data is received but not yet decoded, and that each segment has a playing duration of 10 s, then after receiving the next segment, 16 s+10 s=26 s of data have been downloaded and not yet decoded, except that some of this data would have been decoded, as the downloading would have taken some time. In order to have a minimum buffer duration of 15 s at the end of downloading this next segment, the downloading could take at most 26 s−15 s=11 s. Therefore, the client decision making module 608 calculates the time available to download the next segment, which in this worked example is 11 s.

The client decision making module 608 then goes on to determine the maximum segment bit rate of the next segment that can be downloaded, subject to the time available to download constraint and given the previously estimated network bit rate. For example, if the available network throughput has been estimated to be 3.1 MBit/s, then the maximum bit rate of a segment, of 10 s duration, that could be downloaded at this bit rate in the available time (11 s) is given by: 3.1 MBit/s×11 s/10 s=3.41 MBit/s.

In general, this calculation is given by:

$$\text{Maximum segment bit rate} = (\text{estimated network bit rate}) \times (\text{time available to download}) / (\text{next segment duration}) \quad (2)$$

In this example, the client decision making module 608, knowing that segments are available at the bit rates of 1.3 MBit/s, 2.0 MBit/s, 3.0 MBit/s, and 4.5 MBit/s, selects a segment that is no more than the calculated maximum segment bit rate of 3.41 MBit/s. In general, the largest bit rate segment that is no more than the calculated maximum segment bit rate is chosen. In this example, the selected encoded bit rate is 3.0 MBit/s, and the client decision making module 608 then issues a request on the input interface 802 to the content server 104, for the next content segment, numbered 120, encoded at selected rate of 3.0 MBit/s. The server 104 delivers the requested segment to the client device.

The results of a simulation illustrating the effect of this approach by the client in two different network bit rate scenarios is now described. In both scenarios, the network bit rate has been approximately 3.1 MBit/s for some time, so that the estimate of the available network throughput made by the client decision making module 608 is 3.1 MBit/s. In the first example scenario, the network throughput remains at 3.1 MBit/s throughout the period of the scenario; while in the second example scenario, the network throughput remains at 3.1 MBit/s, except for the period from 30 s to 40 s when it drops to 1.5 MBit/s.

The table below shows the client behaviour in the first network scenario, with constant network throughput.

TABLE 2

| Segment Index | Time Segment Requested (s) | Play-Time of Buffered Data (s) | Estimated Network Bit Rate (MBit/s) | Selected Segment Bit Rate (MBit/s) |
|---|---|---|---|---|
| 120 | 0.0 | 16.000 | 3.100 | 3.0 |
| 121 | 9.7 | 16.323 | 3.100 | 3.0 |
| 122 | 19.4 | 16.647 | 3.100 | 3.0 |
| 123 | 29.1 | 16.970 | 3.100 | 3.0 |
| *124* | *38.8* | *17.293* | *3.100* | *3.0* |
| 125 | 48.5 | 17.617 | 3.100 | 3.0 |
| 126 | 58.2 | 17.940 | 3.100 | 3.0 |

The row describing the segment with higher viewer importance, the segment numbered 124, is shown in bold and italics. It can be seen that because the viewer importance information has not been used, all segments, including the one indicated as being of higher importance to the viewer, have been delivered with encoded bit rate equal to 3.0 MBit/s. While this may be considered acceptable, the encoded bit rate of 4.5 MBit/s is available. As will be described below, by making use of the viewer importance information contained in the manifest file, segment 124 could have been delivered at an encoded bit rate of 4.5 MBit/s, by reducing the bit rate of some of the other, lower importance, segments.

The following example further highlights the problem, where the network bit rate drops from 3.1 MBIt/s to 1.5 MBit/s from time 30 s to time 40 s.

TABLE 3

| Segment Index | Time Segment Requested (s) | Play-Time of Buffered Data (s) | Estimated Network Bit Rate (MBit/s) | Selected Segment Bit Rate (MBit/s) |
|---|---|---|---|---|
| 120 | 0.0 | 16.000 | 3.100 | 3.0 |
| 121 | 9.7 | 16.323 | 3.100 | 3.0 |
| 122 | 19.4 | 16.647 | 3.100 | 3.0 |
| 123 | 29.1 | 16.970 | 3.100 | 3.0 |
| *124* | *44.0* | *12.133* | *2.567* | *1.3* |
| 125 | 48.2 | 17.949 | 2.567 | 3.0 |
| 126 | 57.9 | 18.272 | 2.567 | 3.0 |

The row describing the segment with higher viewer importance, the segment numbered 124, is again shown in bold and italics. It can be seen that because the viewer importance information has not been used, the segment indicated as being of higher importance to the viewer, has been delivered with the lowest quality of all the segments listed in the table, being delivered with an encoded bit rate equal to 1.3 MBit/s. This would give a poor experience to the viewer: while the preceding and following segments of lower interest are delivered at an acceptable quality, the one that is of highest interest has actually been delivered at poor quality. This can be explained by examining actual network bit rate.

In this example, the network bit rate dropped from 3.1 MBit/s to 1.5 MBit/s from time 30 s to time 40 s, being, in this case, from just after segment 123 was requested at 3.0 MBit/s at 29.1 s, until just before its delivery has been completed. Hence delivery took longer than the client had predicted, and as a result, when the client decision making module 608 makes calculations for segment 124, it finds that the time available for download is only 7.133 s, and the estimated network bit rate is now only 2.567 MBit/s, and hence the maximum segment bit rate is only 1.831 MBit/s, forcing it to choose the segment with encoded bit rate equal to 1.3 MBit/s.

The above problems are solved by the following examples of the invention, which modify the above approach to take into account the viewer importance information in the manifest file. The first solution applies a rate scale factor to the estimated network bit rate when a segment with a higher importance is identified, and uses the scaled network bit rate to calculate the maximum segment bit rate. The second solution adjusts (increases) the amount of data that needs to be buffered when a segment of a higher importance is identified, up to but not including the segment with the higher importance. The third solution makes requests for future segments of higher importance concurrently with the next segment to be downloaded. These three solutions will now be described in more detail.

Figure 7:
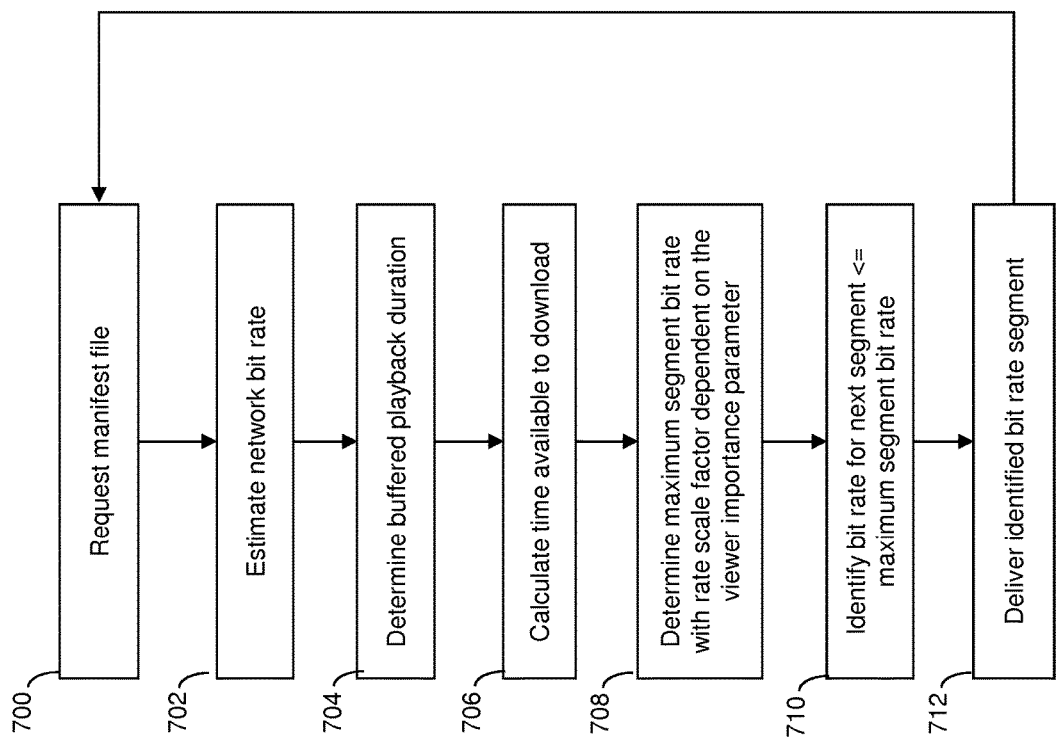
FIG. 7 is a flow chart illustrating an example method using a rate scale factor.

FIG. 7 is a flow chart summarising the first solution using a rate scale factor.

In step 700, the manifest file is requested by the client device and stored in the content segment and manifest store 606. The client state processing and state information store 604 monitors the rate at which data has been received on the input interface 602. In step 702, the client decision making module 608 uses this rate information to estimate of the available network bit rate (or throughput), for example as equal to a running average of the rate at which data has been received over a given period of time (such as a segment duration).

In step 704, the client state processing and state information store 604 also monitors the amount of content segment data that has been received and stored in the content segment and manifest store 606, but not yet decoded and presented to the user. This amount of data can be viewed as the duration of the buffered content.

The client decision making module 608 uses the duration of the buffered data to calculate the time available for downloading the next segment in step 706 using equation (1).

In step 708, the client decision making module 608 determines the maximum segment bit rate of the next segment that can be downloaded, subject to the time available to download and the estimated network bit rate. This first solution also applies a scale factor, a rate scale factor, to the maximum segment bit rate as follows:

$$\text{Maximum segment bit rate} = (\text{rate scale factor}) \times (\text{estimated network bit rate}) \times (\text{time available to download})/(\text{next segment duration}) \quad (3)$$

The rate scale factor can fall in the range 0.0 to 1.0, and is set in dependence on the viewer importance parameter associated with the next segment to be downloaded, and optionally one or more future segments.

The effect of the rate scale factor can be imagined in a number of ways, including but not limited to: a scaling of the maximum segment bit rate; a scaling of the estimated network bit rate, effectively saving some of it for the later request of the segment marked as having higher importance to the viewer; a scaling of the time available for download, effectively saving some time for the later request of the segment marked as having higher importance to the viewer.

The result of the rate scale factor is that the client decision making module 608 may choose a segment encoded at a lower bit rate that it would otherwise do, once it becomes aware of a forthcoming segment marked as having higher importance to the viewer.

The rate scale factor can be chosen by the client decision making module 608 in a number of ways. The rate scale factor may be based only on the viewer importance parameter value associated with the next segment to be downloaded, without looking ahead to future segments visible from the manifest. For example, if there are 3 levels of viewer importance (1 being low, 2 being medium, and 3 being high importance), then the rate scale factor can be set to one of 3 levels as well, with a low rate scale factor (e.g. 0.6) used when the viewer importance is low (1), a higher rate scale factor (e.g. 0.8) when the viewer importance is medium (2), and the highest rate scale factor (1.0) when the viewer importance is highest (1).

Alternatively, the rate scale factor can be set to a fixed value (e.g. 1.0) when the manifest only shows low importance segments, switching to a lower value when a segment of high importance appears on the manifest (e.g. 0.6), and switching again to a high value (e.g. 1.0) when the segment of higher importance is the next segment to be downloaded.

The rate scale factor may depend on the number of segments marked as having lower importance to the viewer before one marked as having higher importance visible from the manifest. For example, it may be desirable to attempt to deliver the segment with higher importance at a specified multiple of the encoded bit rate of the preceding segment or segments with lower importance. As a worked example, if the aim is to deliver the segment with higher importance at double the encoded bit rate of the preceding segments with lower importance, and three such segments were listed in the manifest when the segment with higher importance was first listed, and none of those three segments had yet been requested, then the rate scale factor (rsf) could be set such that (3×rsf)+(2×rsf)=4, which is solved to give rate scale factor rsf=0.8. The equation being the result of wanting to deliver three reduced rate segments and one encoded at double the reduced rate, in four segment durations.

The rate scale factor may depend on the number of segments marked as having higher importance to the viewer visible from the manifest. For example, when more than one segment is listed in the manifest as having higher importance to the viewer, it may be necessary to use a smaller rate scale factor than when only a single segment is listed in the manifest as having higher importance. As a worked example, if the aim is to deliver the two segments listed in the manifest having higher importance at double the encoded bit rate of the preceding segments with lower importance, and three such segments were listed in the manifest when the segments with higher importance were first listed, and none of those three segments had yet been requested, then the rate scale factor, rsf, would be set such that (3×rsf)+(2×2×rsf)=5, which is solved to give rate scale factor rsf=0.714. The equation being the result of wanting to deliver three reduced rate segments and two encoded at double the reduced rate, in five segment durations.

Returning to the flow chart of FIG. 7, in step 710, the bit rate for the next segment to be downloaded is identified as the bit rate that is no greater than the determined maximum segment bit rate. So if the maximum segment bit rate (after scaling) is determined as 2.2 Mbit/s, then the identified bit rate must be one of 1.3 Mbit/s or 2.0 Mbit/s. In general, the highest bit rate segment that does not exceed the maximum segment bit rate is selected.

The client then requests the identified segment and it is delivered in step 712.

The process then repeats for the next segment starting with another request for the next manifest file (such as the 2nd playlist file in Table 1) from step 700.

There now follows an illustration of the client decision making module 608 setting the rate scale factor to 1.0 when no segment of higher importance is visible on the manifest, a constant value of 0.60 when a segment of higher importance is visible, and a constant value of 1.0 when the segment of higher importance is being processed.

The table below shows the client behaviour in the network scenario with constant network bit rate.

TABLE 4

| Segment Index | Time Segment Requested (s) | Play-Time of Buffered Data (s) | Estimated Network Bit Rate (MBit/s) | Selected Segment Bit Rate (MBit/s) |
|---|---|---|---|---|
| 120 | 0.0 | 16.000 | 3.100 | 3.0 |
| 121 | 9.7 | 16.323 | 3.100 | 2.0 |
| 122 | 16.2 | 19.898 | 3.100 | 2.0 |
| 123 | 22.7 | 23.473 | 3.100 | 3.0 |
| *124* | *32.4* | *23.797* | *3.100* | *4.5* |
| 125 | 47.0 | 19.254 | 3.100 | 3.0 |
| 126 | 56.7 | 19.578 | 3.100 | 4.5 |

The row describing the segment with higher viewer importance, the segment numbered 124, is again shown in bold and italics. The segment numbered 120 is requested with an encoded bit rate of 3.0 MBit/s as in the reference case, as at the time of making the request, the client was not aware of the forthcoming segment marked as having higher importance to the viewer. The client is aware of the higher viewer importance segment 124 when making the decisions for intervening segments 121, 122 and 123. In the case of these segments, the client decision making module 608 applies the rate scale factor of 0.60 as above to determine the maximum segment bit rate and hence choose at which encoded bit rate to request these segments. The results in the table show that segments 121 and 122 are requested with an encoded bit rate of 2.0 MBit/s compared to 3.0 MBit/s in the reference case (see Table 2). Segment 123 is requested at the same encoded bit rate, 3.0 MBit/s, as in the reference case, as the amount of data buffered but not yet decoded is significantly higher than in the reference case, thus allowing much more time for downloading this segment, thus counteracting the effect of the rate scale factor.

The client decision making module 608 acts as normal, with a rate scale factor of 1.0 applied, when making a decision for segment 124, but due to the higher amount of data buffered but not yet decoded than in the reference case, requests this segment with an encoded bit rate of 4.5 MBit/s compared to 3.0 MBit/s in the reference case. Segments 125 and 126 are then requested at 3.0 MBit/s and 4.5 MBit/s.

The overall effect is that the segment marked as having higher importance to the viewer is delivered with an encoded bit rate of 4.5 MBit/s, rather than 3.0 MBit/s in the reference case, but at the expense of segments 121 and 122 being delivered with a lower encoded bit rate. However, considering the relative importance to the viewer of these segments, this is an improved outcome. It could be considered that the rate scale factor could have been set to a higher value, as it would have been better to deliver segment 126 at 3.0 MBit/s rather than 4.5 MBit/s, and to have used this network throughput to deliver segment 122 with a higher encoded bit rate, but this must be balanced against the risk that the network throughput may have dropped before the segment marked as having higher importance to the viewer is delivered.

The table below shows the client behaviour in a network scenario with variable network bit rate, where the network bit rate drops from 3.1 MBIt/s to 1.5 MBit/s from time 30 s to time 40 s.

TABLE 5

| Segment Index | Time Segment Requested (s) | Play-Time of Buffered Data (s) | Estimated Network Bit Rate (MBit/s) | Selected Segment Bit Rate (MBit/s) |
|---|---|---|---|---|
| 120 | 0.0 | 16.000 | 3.100 | 3.0 |
| 121 | 9.7 | 16.323 | 3.100 | 2.0 |
| 122 | 16.2 | 19.898 | 3.100 | 2.0 |
| 123 | 22.7 | 23.473 | 3.100 | 3.0 |
| *124* | *35.1* | *21.113* | *2.823* | *4.5* |
| 125 | 52.1 | 14.118 | 2.567 | 2.0 |
| 126 | 58.6 | 17.693 | 2.567 | 3.0 |

The row describing the segment with higher viewer importance, the segment numbered 124, is again shown in bold and italics. The segment numbered 120 is again requested with an encoded bit rate of 3.0 MBit/s, as at the time of making the request, the client was not aware of the forthcoming segment 124 marked as having higher importance to the viewer.

The client decision making module 608 makes the same decisions for segments 121, 122, and 123 as in the constant network bit rate scenario described above, as the network bit rate does not drop to 1.5 MBit/s until time 30 s, which is part way through the delivery of segment 123. Although the reduced network throughput delays the delivery of segment 123, the client decision making module 608 can request segment 124 with an encoded bit rate of 4.5 MBit/s because of the amount of data buffered but not yet decoded (21.113 s, giving a time for download of segment 124 of 16.113 s) and the estimated network bit rate of 2.823 MBit/s. Compared to the reference case as shown in Table 3 where the viewer importance information is not used, segment 124 is requested earlier, when there is more data buffered and not yet decoded, and where the estimated network bit rate is higher because there has been less time with the network at the reduced rate of 1.5 MBit/s.

Hence the client can request the segment with higher viewer importance at the highest rather than the lowest quality.

Figure 8:
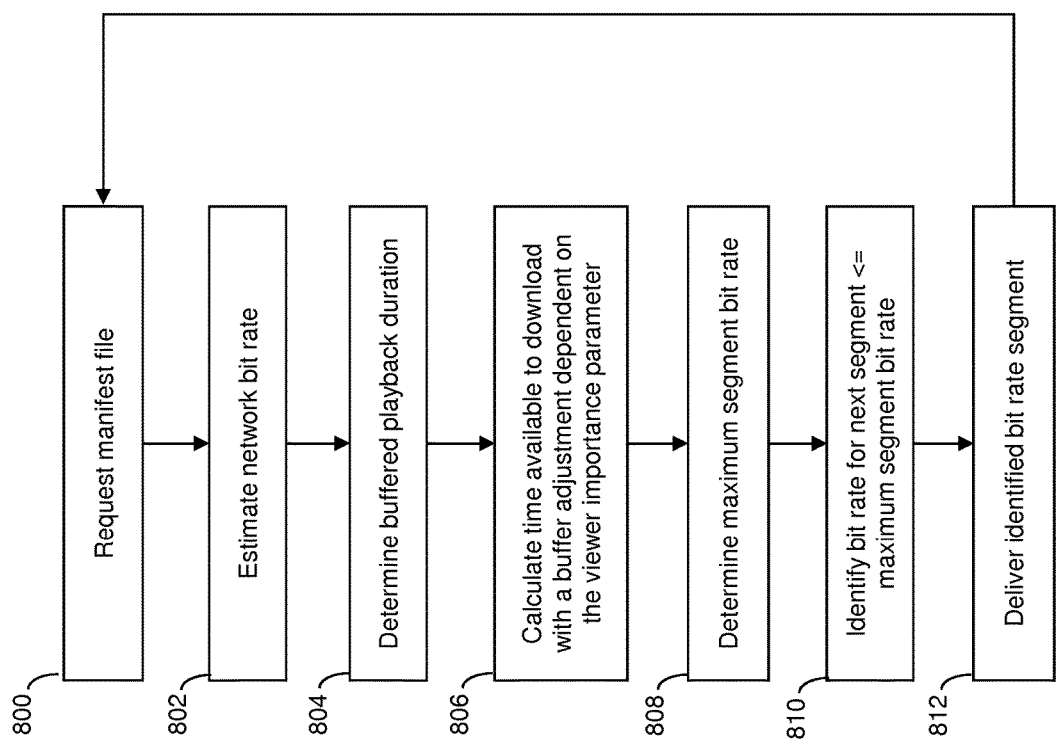
FIG. 8 is a flow chart illustrating an example method using a buffer adjustment.

FIG. 8 is a flow chart summarising the second solution by adjusting the amount of data that needs to be buffered at the client in dependence on the viewer importance parameter of one or more segments.

Steps 800, 802 and 804 correspond to steps 700, 702 and 704 in FIG. 7, where a request is made in step 800 for the manifest file, an estimate of the network bit rate is made in step 802, and the duration of the buffered content is determined in step 804.

Then in step 806, the client decision making module 608 uses the duration of the buffered data to calculate the time available for downloading the next segment using equation (1) and further applies a buffer adjustment parameter as follows:

Time available to download=(Duration of buffered data)+(next segment duration)−(minimum buffer duration)−(buffer adjustment)

The buffer adjustment is set in dependence on the viewer importance parameter of the next segment, and optionally further in dependence on one or more future segments. The buffer adjustment parameter can take positive values and is measured in seconds.

The application of the buffer adjustment parameter can be imagined as reducing the time available to download the next segment, thus making more time available for delivery of the segment marked as having higher importance to the viewer.

The buffer adjustment parameter can be chosen by the client decision making module 608 in a number of ways. The buffer adjustment factor may be based on the viewer importance parameter of only the next segment to be downloaded. For example, a high buffer adjustment (e.g. 6 s) could be applied if the viewer importance parameter of the next segment is low, but a low buffer adjustment (e.g. 2 s or even 0 s) could be applied if the viewer importance parameter of the next segment is high.

Alternatively, the buffer adjustment could be set to zero for the next segment if only low importance segments are visible on the manifest, but set to some non-zero value (e.g. 4 s), as soon as a segment with a higher viewer importance value appears on the manifest, and switching to zero again when the segment of higher importance is the next segment to be downloaded.

In another approach, the buffer adjustment parameter may be set in dependence on the number of segments marked as having lower viewer importance before the one marked as having higher importance, and in particular, it may be increased with each segment marked as having lower viewer importance until the one marked as having higher importance, when it can be set to zero. For example, if it were desirable to aim to deliver the segment with higher importance at double the encoded bit rate of the preceding segments with lower importance, and three such segments were listed in the manifest when the segment with higher importance was first listed, and none of those three segments had yet been requested, and if the segment duration is 10 s for all relevant segments, and if the duration of buffered data equals the minimum buffer duration, then the buffer adjustment (ba) would be set such that 3×(10−ba)+2×(10−ba)=40, which is solved to give buffer adjustment ba=2 s. The equation is the result of wanting to deliver three segments with reduced time available to download and one segment with double this time available to download. In this case, the first of the three segments with lower importance would have buffer adjustment equal to 2 s, the second would have buffer adjustment equal to 4 s, and the third would have buffer adjustment equal to 6 s, giving a nominal time of 8 s to deliver each of the three segments with lower importance and 16 s to deliver the segment with higher importance.

The buffer adjustment parameter may also depend on the number of segments marked as having higher importance to the viewer. For example, when more than one segment is listed in the manifest as having higher importance to the viewer, it may be necessary to use a larger buffer adjustment than when only a single segment is listed in the manifest as having higher importance. For example, if it were desirable to aim to deliver the two segments listed in the manifest as having higher importance at double the encoded bit rate of the preceding segments with lower importance, and three such segments were listed in the manifest when the segments with higher importance were first listed, and none of those three segments had yet been requested, and if the segment duration is 10 s for all relevant segments, and if the duration of buffered data equals the minimum buffer duration, then the buffer adjustment (ba) would be set such that $3 \times (10-ba) + 4 \times (10-ba) = 50$, which is solved to give buffer adjustment ba=2.857 s. The equation is the result of wanting to deliver three segments with reduced time available to download and two segments each with double this time available to download. In this case, the first of the three segments with lower importance would have buffer adjustment equal to 2.857 s, the second would have buffer adjustment equal to 5.714 s, and the third would have buffer adjustment equal to 8.571 s, giving a nominal time of 7.143 s to deliver each of the three segments with lower importance and 14.286 s to deliver the segment with higher importance.

The client decision making module 608, having calculated the time available to download a segment, then goes on to determine the maximum segment bit rate in step 808 according to equation (2). Note, the maximum segment bit rate may have effectively been reduced depending on what the buffer adjustment parameter was set to.

In step 810, the bit rate for the next segment to be downloaded is identified as the bit rate that is no greater than the determined maximum segment bit rate. So if the maximum segment bit rate is determined as 2.2 Mbit/s, then the identified bit rate must be one of 1.3 Mbit/s or 2.0 Mbit/s. In general, the highest bit rate segment that does not exceed the maximum segment bit rate is selected.

The client then requests the identified segment and it is delivered in step 812.

The process then repeats for the next segment starting with another request for the next manifest file from step 800.

There now follows an illustration of the client decision making module 608 setting the buffer adjustment to 3 s for the first segment, 121, marked as having lower viewer importance once the forthcoming segment, 124, marked as having higher viewer importance, is known about. Then increasing the buffer adjustment by 3 s with each segment of a lower viewer importance until the segment with a higher importance is reached, when the buffer adjustment is set to zero. Thus the buffer adjustment parameter is set to 6 s for the segment 122, and to 9 s for segment 123, but zero for segment 124.

The table below shows the client behaviour in the network scenario with constant network bit rate.

TABLE 6

| Segment Index | Time Segment Requested (s) | Play-Time of Buffered Data (s) | Estimated Network Bit Rate (MBit/s) | Selected Segment Bit Rate (MBit/s) |
|---|---|---|---|---|
| 120 | 0.0 | 16.000 | 3.100 | 3.0 |
| 121 | 9.7 | 16.323 | 3.100 | 2.0 |
| 122 | 16.2 | 19.898 | 3.100 | 2.0 |
| 123 | 22.7 | 23.473 | 3.100 | 2.0 |
| *124* | *29.2* | *27.048* | *3.100* | *4.5* |
| 125 | 43.8 | 22.506 | 3.100 | 4.5 |
| 126 | 58.4 | 17.964 | 3.100 | 3.0 |

The row describing the segment with higher viewer importance, the segment numbered 124, is again shown in bold and italics. The segment numbered 120 is requested with an encoded bit rate of 3.0 MBit/s as in the reference case, as at the time of making the request, the client was not aware of the forthcoming segment marked as having higher importance to the viewer. The client is aware of the higher viewer importance segment 124 when making the decisions for intervening segments 121, 122 and 123. In the case of these segments, the client decision making module 608 applies the buffer adjustment parameter of 3 s, 6 s and 9 s, as above, to determine the time available for download of the segments 121, 122, and 123 respectively, and consequently calculates the maximum segment bit rate for each, and then chooses at which encoded bit rate to request these segments. The results in the table show that each of the segments 121, 122 and 123 are requested with an encoded bit rate of 2.0 MBit/s compared to 3.0 MBit/s in the reference case.

The client decision making module 608 acts as normal, with a value of zero used for the buffer adjustment parameter, when making a decision for the higher viewer importance segment 124. However, due to the higher amount of data buffered but not yet decoded than in the reference case, the maximum segment bit rate is higher, and so the bit rate of the requested segment is 4.5 MBit/s compared to 3.0 MBit/s in the reference case. Segments 125 and 126 are then requested at 4.5 MBit/s and 3.0 MBit/s respectively.

The overall effect is that the segment marked as having higher importance to the viewer is delivered with an encoded bit rate of 4.5 MBit/s, rather than 3.0 MBit/s in the reference case, but at the expense of segments 121, 122 and 123 being delivered with a lower encoded bit rate. However, considering the relative importance to the viewer of these segments, this is an improved outcome. It could be considered that the buffer adjustment parameter could have been set to a lower value, as it would have been better to deliver segment 125 at 3.0 MBit/s rather than 4.5 MBit/s, and to have used this network throughput to deliver one of the earlier segments with a higher encoded bit rate, but this must be balanced against the risk that the network throughput may have dropped before the segment marked as having higher importance to the viewer is delivered.

The table below shows the client behaviour in the network scenario with variable network bit rate, where the network bit rate drops from 3.1 MBit/s to 1.5 MBit/s from time 30 s to time 40 s.

TABLE 7

| Segment Index | Time Segment Requested (s) | Play-Time of Buffered Data (s) | Estimated Network Bit Rate (MBit/s) | Selected Segment Bit Rate (MBit/s) |
|---|---|---|---|---|
| 120 | 0.0 | 16.000 | 3.100 | 3.0 |
| 121 | 9.7 | 16.323 | 3.100 | 2.0 |
| 122 | 16.2 | 19.898 | 3.100 | 2.0 |
| 123 | 22.7 | 23.473 | 3.100 | 2.0 |
| *124* | *29.2* | *27.048* | *3.100* | *4.5* |
| 125 | 48.9 | 17.364 | 2.567 | 3.0 |
| 126 | 58.6 | 17.687 | 2.567 | 3.0 |

The row describing the segment with higher viewer importance, the segment numbered 124, is again shown in bold and italics. The segment numbered 120 is again requested with an encoded bit rate of 3.0 MBit/s, as at the time of making the request, the client was not aware of the forthcoming segment marked as having higher importance to the viewer.

The client decision making module 608 makes the same decisions for segments 121, 122, and 123 as in the constant network bit rate scenario described above, as the network bit rate does not drop to 1.5 MBit/s until time 30 s, by which time the delivery of segment 123 has been completed. The client decision making module 608 makes a decision about segment 124 before the network bit rate drops, and this together with the large amount of data buffered but not yet decoded (27.048 s, giving a time for download of segment 124 of 32.048 s) can decide to request segment 124 with an encoded bit rate of 4.5 MBit/s.

Compared to the reference case where the viewer importance information is not used, segment 124 is requested earlier, when there is more data buffered and not yet decoded, and where the estimated network bit rate is higher because the network bit rate has not yet dropped. Hence, the client can request the segment with higher viewer importance at the highest rather than the lowest quality.

The period of reduced network throughput from 30 s to 40 s affects the delivery of segment 124, making delivery take 19.7 s (from 29.2 s to 48.9 s), but this is not a problem as delivery started early with a large amount of data buffered but not yet decoded, a result of requesting and receiving the preceding segments at a lower encoded bit rate.

The amount of buffered data is back to more normal levels by the time the client decision making module 608 makes a decision for the next segment, 125, which it requests with a bit rate of 3.0 MBit/s, as in the reference case.

In the third solution, as soon as the client is aware of a forthcoming segment marked as having higher importance to the viewer, the client initiates the download of this segment by making a request (e.g. HTTP request), while continuing to make requests for the intermediate segments as normal.

The effect of this is to initiate the delivery of the segment marked as having higher importance to the viewer as soon as possible to ensure that it is delivered on time at the highest possible, or highest practical, quality (bit rate). The network bit rate available for downloading the intermediate segments is therefore reduced, and the client may have to request these with a lower encoded bit rate than it otherwise would do.

The client decision making module 608 may choose to request the segment marked as having higher importance to the viewer with the highest encoded bit rate, or may choose, because, for example, the estimated network bit rate is relatively low, to request the segment with some lower encoded bit rate. The bit rate of the higher importance segment should be equal to or higher than that of other recent segments marked as having lower importance to the viewer, or equal to or higher than at least one of the intermediate segments having a lower importance.

The client decision making module 608 may control the rate at which the segment marked as having higher importance to the viewer is downloaded, for example, when using TCP delivery, by controlling the rate at which segment data is removed from the input interface 602 and written into the content segment and manifest store 606. It should be noted that the rate of a TCP download can be controlled by the signalling of the receiver buffer size, and the timing of packets sent to acknowledge receipt of data.

While it is possible that the client decision making module 608 may allow the segment marked as having higher importance to the viewer to be downloaded as fast as possible, this would cause maximum impact on the bit rate available for the delivery of the intermediate segments. In this case these intermediate segments would not start to be downloaded until the segment marked as having higher importance to the viewer was completely downloaded. This may mean there is insufficient time to complete the downloading of the intermediate segments for play-out without stalling, or may limit the quality that could be delivered on time to an unreasonably low level.

Instead it is preferable to download the segment marked as having higher importance to the viewer at the same time as the intermediate segments, sharing the available network bandwidth between the two so as to ensure timely delivery of all segments, and at an acceptable quality for the intermediate segments while optimising the quality of the segment marked as having higher importance to the viewer. The quality or bit rate of the higher importance segment should be chosen to be equal to or higher than that of the intermediate segments marked as having lower importance.

The client decision making module 608 needs to determine the encoded bit rate at which to request the segment marked as having higher importance to the viewer, and needs to determine the rate at which this segment is to be downloaded concurrently with the intermediate segments.

There are many ways in which the client decision making module 608 could make these decisions. The following are examples.

For example, the client decision making module 608 could impose a maximum on the percentage of the network throughput that could be used for the concurrent downloading of the segment marked as having higher importance to the viewer, such as 30%, and could impose a maximum time to complete the download of this segment after the delivery of the intermediate segments has been completed, such as 70% of the segment duration.

This is illustrated with the following worked example where the network throughput is 3.1 MBit/s, the segment duration is 10 s, and there are three intermediate segments. The 30% bandwidth share limits the data that could be downloaded concurrently with the three intermediate segments to 3.times.30%.times.3.1 MBit/s.times.10 s=27.9 MBit. The 70% non-concurrent limit allows a further 70%.times.10 s.times.3.1 MBit/s=21.7 MBit to be downloaded, making a total of 49.6 MBit, which corresponds to a maximum encoded segment bit rate of 49.6 MBit/10 s=4.96 MBit/s. In this case the client decision making module 608 would request the segment marked as having higher importance to the viewer at an encoded bit rate of 4.5 MBit/s, the highest bit rate available. The part of this segment to be delivered concurrently with the three intermediate segments is then 45 MBit-21.7 MBit=23.3 MBit, which leaves 3.times.3.1 MBit/s.times.10 s–23.3 MBit=69.7 MBit for the three intermediate segments, which could therefore have a maximum encoded bit rate of 69.7 MBit/ 3/10 s=2.3 MBit/s. The client decision making module 608 would request the first intermediate segment at an encoded bit rate of 2.0 MBit/s, the highest rate no greater than 2.3 MBit/s, and would make decisions for the subsequent intermediate segments at the time that they are requested, in order to allow for any changes in the network bandwidth.

In another example, the client decision making module 608 may aim to download a given proportion of the segment marked as having higher importance to the viewer by a specified time or by the time the immediately preceding segment (numbered 123 in our examples) is completely downloaded, and a decision about the higher importance segment would normally have to be made.

The concurrent download rate of the segment marked as having higher importance to the viewer may be dependent on the number of segments marked as having lower importance to the viewer before the one marked as having higher importance. It may depend on the number of segments marked as having higher importance to the viewer. It may depend on how low or high the estimated network bit rate is relative to the set of encoded bit rates used for encoding the content: for example, if the estimated network bit rate is easily enough to deliver all segments at the highest available encoded bit rate, then no concurrent request may be needed to ensure delivery of segments marked as having higher importance to the viewer at the highest encoded bit rate, and hence the concurrent download rate could be set at or near to 0.0. Other methods for choosing the concurrent download rate and the encoded bit rate at which to request the segment marked as having higher importance to the viewer are possible.

The consequence of requesting a segment marked as having higher importance to the viewer concurrently with continuing to make requests for the intermediate segments as normal is that the client decision making module 608, when calculating the maximum segment bit rate for the intermediate segments, must allow for the bit rate being used concurrently to download the segment marked as having higher importance to the viewer, referred to as bit rate used for concurrent download, in the equation below:

Maximum intermediate segment bit rate=(estimated network bit rate−bit rate used for concurrent download)×time available for download/segment duration We will now illustrate the results of simulating the client decision making module aiming to download 60% of the segment, numbered 124, marked as having higher importance to the viewer, by the time that the preceding segment, numbered 123, has been downloaded.

The table below, Table 8, shows the client behaviour in the first network scenario, with constant network throughput.

TABLE 8

| Segment Index | Time Segment Requested (s) | Play-Time of Buffered Data (s) | Estimated Network Bit Rate (MBit/s) | Selected Segment Bit Rate (MBit/s) |
| --- | --- | --- | --- | --- |
| 120 | 0.0 | 16.000 | 3.100 | 3.0 |
| 121 | 9.7 | 16.323 | 3.100 | 2.0 |
| 122 | 18.8 | 17.278 | 3.100 | 2.0 |
| 123 | 27.9 | 18.188 | 3.100 | 2.0 |
| *124* | *(37.0)* | *(19.098)* | *3.100* | *4.5* |
| 125 | 43.7 | 22.454 | 3.100 | 4.5 |
| 126 | 58.3 | 17.912 | 3.100 | 3.0 |

The row describing the segment with higher viewer importance, the segment numbered 124, is again shown in bold and italics to make it more easily identified.

Initially, the segment numbered 120 is requested with an encoded bit rate of 3.0 MBit/s as in the reference case, as at the time of making the request, the client was not aware of the forthcoming segment marked as having higher importance to the viewer as the playlist file requested at the time only contains details of segments 120, 121, 122 and 123.

When the client receives the next, updated, playlist file containing details of segments 121, 122, 123 and 124, it will know that segment 124 is marked as having higher importance to the viewer than any one of segments 121, 122 or 123. The client decision making module 608 will then request segment 124 with an encoded bit rate of 4.5 MBit/s, and will then make decisions for intervening segments 121, 122 and 123. The concurrent download bit rate for segment 124 is set such that 60% of it would be downloaded in three segment durations. Note that at this time the precise time to download the three intermediate segments is not known, and so their playout duration is used instead. As the aim is also to keep the amount of data buffered, measured in terms of the play-out time it represents, constant, this is a reasonable assumption. The concurrent download bit rate is therefore set to 0.6.times.4.5/3=0.9 MBit/s.

This leaves 3.1-0.9=2.2 MBit/s for the downloading of the intermediate segments. The client decision making module 608 uses this rate and the time available for download to calculate the maximum segment bit rate, and then chooses at which encoded bit rate to request the next segment, segment 121.

The client then requests the next playlist file, which contains references to segments 122, 123, 124 and 125. The client can see segment 124 having a higher importance parameter value than segments 122 and 123. However, as segment 124 was already requested in an earlier step, it is ignored.

In the simulation, it was found that 54.6% of segment 124 had been downloaded when delivery of segment 123 completed. If it were important to meet the predetermined target of 60%, then this could have been done by adjusting the rate at which segment 124 was being downloaded concurrently with the intermediate segments.

The table shows that segment 124 was requested at time 37.0 s. This is not true as it was actually requested at time 9.7 s, the same time that segment 121 was requested. However, time 37.0 is when the delivery of segment 123 completed, and when non-concurrent delivery of 124 started.

The results in the table show that segments 121, 122 and 123 are requested with an encoded bit rate of 2.0 MBit/s compared to 3.0 MBit/s in the reference case.

The client decision making module 608 acts as normal for segments 125 and 126 which are requested at 4.5 MBit/s and 3.0 MBit/s.

The overall effect is that the segment marked as having higher importance to the viewer is delivered with an encoded bit rate of 4.5 MBit/s, rather than 3.0 MBit/s in the reference case, but at the expense of segments 121, 122 and 123 being delivered with a lower encoded bit rate. But considering the relative importance to the viewer of these segments, this is an improved outcome. It could be considered that the concurrent download rate for segment 124 could have been lower, by aiming for a smaller proportion of it being delivered by the time delivery of segment 123 had completed, as it would have been better to deliver segment 125 at 3.0 MBit/s rather than 4.5 MBit/s, and to have used this network throughput to deliver one of the earlier segments with a higher encoded bit rate, but this must be balanced against the risk that the network throughput may have dropped before the segment marked as having higher importance to the viewer is delivered.

The table below, Table 9, shows the client behaviour in the second network scenario, with variable network throughput, where the network throughput drops from 3.1 MBit/s to 1.5 MBit/s from time 30 s to time 40 s.

TABLE 9

| Segment Index | Time Segment Requested (s) | Play-Time of Buffered Data (s) | Estimated Network Bit Rate (MBit/s) | Selected Segment Bit Rate (MBit/s) |
| --- | --- | --- | --- | --- |
| 120 | 0.0 | 16.000 | 3.100 | 3.0 |
| 121 | 9.7 | 16.323 | 3.100 | 2.0 |
| 122 | 18.8 | 17.278 | 3.100 | 2.0 |
| 123 | 27.9 | 18.188 | 3.100 | 2.0 |
| *124* | *(44.3)* | *(11.828)* | *2.567* | *4.5* |
| 125 | 48.8 | 17.328 | 2.567 | 3.0 |
| 126 | 58.5 | 17.652 | 2.567 | 3.0 |

The row describing the segment with higher viewer importance, the segment numbered 124, is again shown in bold and italics to make it more easily identified. The segment numbered 120 is again requested with an encoded bit rate of 3.0 MBit/s, as at the time of making the request, the client was not aware of the forthcoming segment marked as having higher importance to the viewer.

As in the constant network throughput scenario described above, segment 124 is downloaded at 0.9 MBit/s concurrently with requests for each of segments 121, 122, and 123 in turn, at 2.2 MBit/s until the network throughput drops, and then at 0.6 MBit/s.

In the simulation, it was found that 69.2% of segment 124 had been downloaded when delivery of segment 123 completed. If it were important to meet the predetermined target of 60%, then this could have been done by adjusting the rate at which segment 124 was being downloaded concurrently with the intermediate segments.

The reason that so much more of segment 124 is downloaded by the time that segment 123 is downloaded compared to the constant network throughput scenario, is that the reduced network throughput, which occurs between time 30 s and 40 s, affects the delivery of segment 123, but not that of segment 124 which continues at 0.9 MBit/s.

The table shows that segment 124 was requested at time 44.3 s. This is not true as it was actually requested at time 9.7 s, the same time that segment 121 was requested. However, time 44.3 is when the delivery of segment 123 completed, and when non-concurrent delivery of 124 started.

The client decision making module 608 acts as normal for segments 125 and 126 which are requested at 3.0 MBit/s. The overall effect is that the segment marked as having higher importance to the viewer is delivered with an encoded bit rate of 4.5 MBit/s, rather than 3.0 MBit/s in the reference case, but at the expense of segments 121, 122 and 123 being delivered with a lower encoded bit rate.

Figure 9:
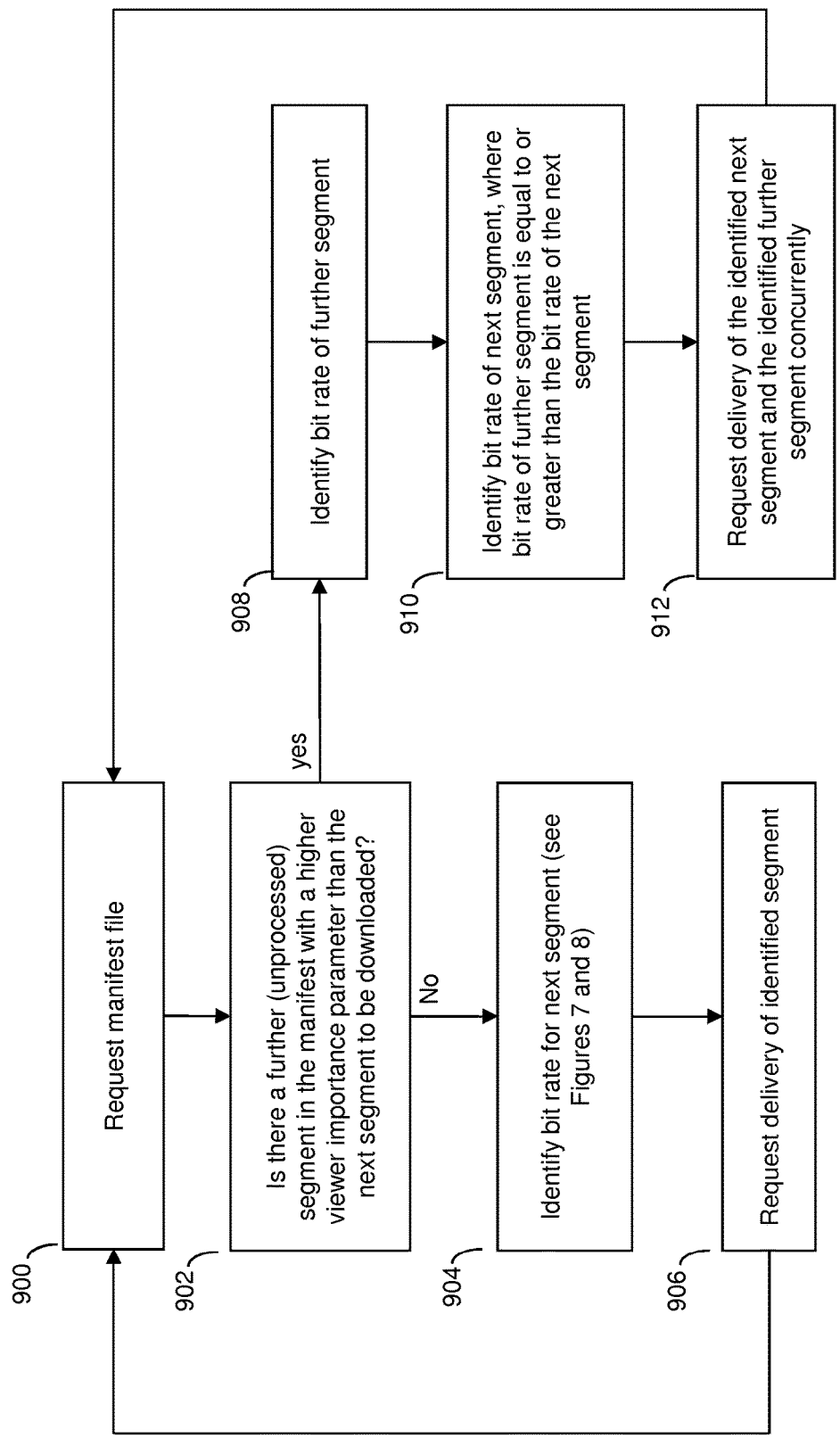
FIG. 9 is a flow chart illustrating an example method with concurrent segment delivery.

FIG. 9 shows a flow chart summarising the steps of this third solution using concurrent downloading.

In step 900, the manifest file is requested by the client device and stored in the content segment and manifest store 606. Initially, let us assume that the manifest file is as per the first playlist file in Table 1, where only segments 120, 121, 122 and 123 are listed.

In step 902, the client decision making module 608 checks the manifest to determine whether there is a further (as yet unprocessed) segment with a higher viewer importance parameter value than the next segment to be downloaded. The next segment to be downloaded is segment 120, but all the other segments have the same viewer importance parameter value. Thus, processing passes to step 904, where the bit rate for the next segment is determined as set out in either one of the embodiments illustrated in FIG. 7 or FIG. 8. Then in step 906, the identified next segment is delivered and processing passes back to step 900, where the next manifest file is requested.

The next manifest file is as per the second playlist file in table 1, where segments 121, 122, 123 and 124 are listed. Again, in step 902 the client decision making module 608 checks this manifest to determine whether there is a further (as yet unprocessed) segment with a higher viewer importance parameter value than the next segment to be downloaded. The next segment to be downloaded is segment 121, but now segment 124 is identified, which has a viewer importance parameter of 2, compared to a viewer importance parameter of 1 for segment 121. Thus, processing passes to step 908.

In step 908, the bit rate of the further segment, segment 124, is identified from the list of available bit rates for that segment. In step 910, the bit rate of the next segment, segment 121, is identified from the list of available bit rates for that segment, with the condition that the bit rate of the further segment is equal to or greater than the bit rate of the next segment.

Then in step 912, a request is made for the delivery of both the next segment (segment 121) at the identified bit rate and further segment (segment 124) at the identified bit rate concurrently.

Processing then returns to step 900 where a request is made for the next manifest file.

The next manifest file is as per the third playlist file in table 1, where segments 122, 123, 124 and 125 are listed. Again, in step 902 the client decision making module 608 checks this manifest to determine whether there is a further (as yet unprocessed) segment with a higher viewer importance parameter value than the next segment to be downloaded. The next segment to be downloaded is segment 122, but whilst segment 124 is listed and does have a viewer importance parameter greater than that of segment 122, it has already been processed. As such processing passes to step 904, where the bit rate for the next segment is determined as set out in either one of the embodiments illustrated in FIG. 7 or FIG. 8. Then in step 906, the identified next segment, segment 122, is delivered and processing passes back to step 900, where the next manifest file is requested and processing repeats until all segments have been delivered.

There now follows a description of some other ways examples of the invention can be implemented.

Firstly, the examples of the invention can also be implemented using full duplex HHTP-based protocols.

The conventional approach to adaptive bit rate content delivery using HTTP, using such protocols as Apple HLS, MPEG DASH and Microsoft SmoothStreaming, is known to suffer significant latency, which is undesirable for live broadcast services, and in particular, for live broadcast of sports content. The latency is due in part to the client having to wait for a segment of content to be advertised as being available. For example, when using Apple HLS, it is necessary to wait until the new segment is listed in an updated playlist file, before the new segment can be requested. With MPEG DASH, it is necessary for the client to determine from timing information in the manifest file (MPD) and its own clock, together with a margin for error, when a new segment becomes available, and only then to make a request for it.

This problem of having to know exactly when a segment is available before being able to make a request for it, is being addressed in the industry. In particular, the standard IS 23009-6, "DASH over Full Duplex HTTP-based Protocols (FDH)", is being developed to provide a solution.

The approach is to augment the existing mechanisms of MPEG-DASH over HTTP 1.1 by utilising the new features and capabilities of Internet protocols such as HTTP/2 and WebSocket. These allow server-initiated and client-initiated transactions, data request cancelation, and multiplexing of multiple data responses, which can be used to reduce latency.

In this case, the content client 108 initiates a media channel, over which the content server 104 can actively push data to the content client 108, using for example HTTP/2 server push or WebSocket messaging. The media channel is established via the HTTP/1.1 protocol upgrade mechanism. After the upgrade, the content client 108 requests a media segment or the manifest file from the content server 104, with a URI and a push strategy, which indicates to the content server 104 how the media delivery to the content client 108 should occur, for example, whether it should be initiated by the content server 104 or the content client 108. When the content server 104 has received the request, it responds with the requested data and initialises the push cycle as defined in the push strategy.

For example, the content client 108 firstly requests the manifest file with a push strategy, and on receiving the manifest file, it requests video segments from the content server 104 with a segment push strategy. Then, the content server 104 responds with the first requested video segment, followed by the push cycles as indicated by the segment push strategy. Typically, the content client 108 starts decoding and playing back the content after a minimum amount of data is received and continues to decode and play back content as it is pushed from the content server 104, until the end of the media streaming session.

In this case, the content server 104 can choose the encoded bit rate, from the set of bit rates at which the content is encoded, for each segment pushed to the content client 108. This decision can be made without use of this invention taking into account an estimate of the network throughput to the content client 108 and an estimate of the amount of data received and buffered but not yet decoded by the content client 108.

In addition, the content server 104 can make this decision using knowledge of the viewer importance of each segment, choosing segments encoded at a higher bit rate for segments marked as having higher importance to the viewer, and choosing segments encoded at a lower bit rate for segments marked as having lower importance to the viewer, using substantially the same methodology as described above for the case of the content client 108 making the decisions.

Furthermore, the signalling of viewer importance information is not limited to its being included in the manifest file. It could be signalled to the content client 108 in a number of different ways.

In one approach, the viewer importance information of all or some forthcoming segments is signalled with the content segment data of a current segment. When content segment data uses the MPEG-2 Transport Stream format, as specified in IS 13818-1, the viewer importance information could, for example, be carried in a stream of packets with a specific PID (packet identifier, a field in the MPEG-2 Transport Stream packet header), different to that used for audio or video data, using a syntax that can signal viewer importance information for a set of segment numbers. Alternatively, the viewer importance information could be carried using a similar syntax in MPEG-2 Transport Stream descriptors, found in PSI tables regularly included in the MPEG-2 Transport Stream, for example, the Program Map Table. Alternatively, the viewer importance information could be carried using a similar syntax in one of the encoded media streams, for example, in the encoded video stream, using for example, Supplemental Enhancement Information (SEI) messages in an H.264 or H.265 encoded video stream.

When content segment data uses the ISO Base Media File Format, as specified in IS 14496-12, the viewer importance information could be carried in one of the encoded media streams as described above, or could be carried in the file format itself, using, for example, a specific 'box' defined to have a syntax that can signal viewer importance information for a set of segment numbers.

In another approach, the viewer importance information of all or some forthcoming segments is signalled in a file separate to the manifest file, but the location of which may be signalled in the manifest file or signalled in the content segment data. This file may contain all viewer importance information for the content and hence only need be retrieved once, by a content client 108 that understands the viewer importance information. Or it may only contain viewer importance information for a small number of forthcoming segments, in which case the file would need to be received repeatedly, by a content client 108 that understands the viewer importance information, where each update could be specifically requested by the content client 108, or pushed by the content server 104 after initialisation of a push session.

Whilst the above examples have been described with reference to manifest files in the form of HLS playlists, MPEG DASH manifests can be used instead.

Unlike with Apple HLS, when using MPEG DASH, 23009-1, the manifest file, known as the Media Presentation Description (MPD), is usually only requested at the start of receiving and playing a piece of media content. The video on demand use case may be addressed by the MPD specifying the location of a single file for each of the encoded bit rates of each media type (audio, video, etc). The live use case, and also the video on demand use case, may be addressed by the MPD specifying the location of a sequence of files for each of the encoded bit rates of each media type using a template format.

When using MPEG DASH, the viewer importance information can be signalled in a number of different ways, including, but not limited to, the following examples.

The viewer importance information could be signalled within the content data segments as described above.

The viewer importance information could be signalled within a file referenced from the MPD, with the file containing all viewer importance information for the whole media content item and being requested only once, or containing viewer importance information for a small number of forthcoming content segments, and either being requested multiple times, or being requested once within a push session, and the content server 104 pushing updates to the file to the content client 108 as they become available.

The following is an example MPD indicating the location of viewer importance information. The relevant line has been shown bold and italics to make it more easily identified.

```
<?xml version="1.0" encoding="UTF-8"?>
<MPD
xmlns:xsi="http://www.w3.org/2001/XMLSchema-instance"
xmlns="urn:mpeg:DASH:schema:MPD:2011"
xsi:schemaLocation="urn:mpeg:DASH:schema:MPD:2011"
type="static"
```

```
mediaPresentationDuration="PT7199S"
minBufferTime="PT1.2S"
profiles="urn:mpeg:dash:profile:isoff-on-demand:2011">
<BaseURL>http://example.com/</BaseURL>
<ViewerInterestURL>http://example.com/ViewerInterest.xml</ViewerI
nterestURL>
<Period>
<!-- Audio -->
<AdaptationSet mimeType="audio/mp4" codecs="mp4a.0x40" lang="en"
SubsegmentAlignment="true">
<Representation id="1" bandwidth="64000">
<BaseURL>audio_content.mp4</BaseURL>
</Representation>
</AdaptationSet>
<!-- Video -->
<AdaptationSet mimeType="video/mp4" codecs="avc1.4d0228"
SubsegmentAlignment="true">
<Representation id="2" bandwidth="1300000" width="720"
height="360">
<BaseURL>video_content_at_1M3.mp4</BaseURL>
</Representation>
<Representation id="3" bandwidth="2000000" width="960"
height="540">
<BaseURL>video_content_at_2M0.mp4</BaseURL>
</Representation>
<Representation id="4" bandwidth="3000000" width="1440"
height="720">
<BaseURL>video_content_at_3M0.mp4</BaseURL>
</Representation>
<Representation id="5" bandwidth="4500000" width="1440"
height="720">
<BaseURL>video_content_at_4M5.mp4</BaseURL>
</Representation>
</AdaptationSet>
</Period>
</MPD>
```

The viewer importance information could be signalled explicitly within the MPD, for example, for the video on demand use case. This could be signalled in many different ways, with various encoding options. The following is an example MPD which includes the viewer importance information as a text string, with one character for each segment, with the decimal interpretation of each character being indicative of the viewer importance. The relevant line has been shown bold and italics to make it more easily identified. Note that for brevity, the string of characters has been shortened to state explicitly only the first three values and the last two, whereas in practice, there would be a value for each segment.

```
<?xml version="1.0" encoding="UTF-8"?>
<MPD
xmlns:xsi="http://www.w3.org/2001/XMLSchema-instance"
xmlns="urn:mpeg:DASH:schema:MPD:2011"
xsi:schemaLocation="urn:mpeg:DASH:schema:MPD:2011"
type="static"
mediaPresentationDuration="PT7199S"
minBufferTime="PT1.2S"
profiles="urn:mpeg:dash:profile:isoff-on-demand:2011">
<BaseURL>http://example.com/</BaseURL>
viewerInterest="121 ... 21"
<Period>
<!-- Audio -->
<AdaptationSet mimeType="audio/mp4" codecs="mp4a.0x40" lang="en"
SubsegmentAlignment="true">
<Representation id="1" bandwidth="64000">
<BaseURL>audio_content.mp4</BaseURL>
</Representation>
</AdaptationSet>
<!-- Video -->
<AdaptationSet mimeType="video/mp4" codecs="avc1.4d0228"
SubsegmentAlignment="true">
<Representation id="2" bandwidth="1300000" width="720"
height="360">
<BaseURL>video_content_at_1M3.mp4</BaseURL>
</Representation>
<Representation id="3" bandwidth="2000000" width="960"
height="540">
<BaseURL>video_content_at_2M0.mp4</BaseURL>
</Representation>
<Representation id="4" bandwidth="3000000" width="1440"
height="720">
<BaseURL>video_content_at_3M0.mp4</BaseURL>
</Representation>
<Representation id="5" bandwidth="4500000" width="1440"
height="720">
<BaseURL>video_content_at_4M5.mp4</BaseURL>
</Representation>
</AdaptationSet>
</Period>
</MPD>
```

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of delivering video content to a client device from a server, said video content comprising a sequence of segments and wherein each of the segments is encoded at a plurality of bit rates, said method comprising:
   a) receiving information at the client device about each segment, wherein the information comprises the bit rates and a viewer importance parameter associated with each segment;
   b) identifying a first segment from the sequence of segments for delivery;
   c) comparing a viewer importance parameter associated with a further segment to a viewer importance parameter associated with the first segment to determine if the viewer importance parameter associated with the further segment is higher than the viewer importance parameter associated with the first segment, the further segment being after the first segment in the sequence of segments; and
   if the further segment has the associated viewer importance parameter that is higher than the viewer importance parameter associated with the first segment, then delivering the identified first segment concurrently with the identified further segment, wherein the identified further segment is encoded at a bit rate that is equal to or higher than the identified first segment, and
   otherwise if the further segment has an associated viewer importance parameter that is not higher than the viewer importance parameter associated with the first segment, then delivering the identified first segment.

2. The method according to claim 1, further comprising:
   determining the network bit rate between the server and client device;
   deciding on a proportion of the network bit rate to make available for delivery of the identified further segment; and
   determining the bit rate of the first segment and the bit rate of the further segment in dependence on the network bit rate and the proportion.

3. The method according to claim 2, wherein determining the bit rate of the first segment and the bit rate of the further segment is further in dependence on a specified time to complete delivery of the further segment.

4. The method according to claim 1, wherein delivering the identified first segment concurrently with the identified further segment comprises making requests for the identified first segment concurrently with the identified further segment.

5. The method according to claim 1, wherein the information about each segment is received in a manifest file.

6. The method according to claim 1, wherein the viewer importance parameters are derived from loudness or audio frequencies that are present in the sequence of segments.

7. The method according to claim 1, wherein the viewer importance parameters are derived from at least one of: an amount of movement within the sequence of segments or a rate of scene changes within the sequence of segments.

8. The method according to claim 1, wherein the viewer importance parameters are derived from a matching of pictures of the sequence of segments to a pre-determined picture.

9. A client device for processing video content delivered from a server, the video content comprising a sequence of segments and wherein each of the segments is encoded at a plurality of bit rates, the client device being configure to provide execution at least comprising:
   a) receiving information at the client device about each segment, wherein the information comprises the bit rates and a viewer importance parameter associated with each segment;
   b) identifying a first segment from the sequence of segments for delivery;
   c) comparing a viewer importance parameter associated with a further segment to a viewer importance parameter associated with the first segment to determine if the viewer importance parameter associated with the further segment is higher than the viewer importance parameter associated with the first segment, the further segment being after the first segment in the sequence of segments; and
   if the further segment has an associated viewer importance parameter that is higher than the viewer importance parameter associated with the first segment, then accepting concurrent delivery of identified first segment and the identified further segment, wherein the identified further segment is encoded at a bit rate that is equal to or higher than the identified first segment, and
   otherwise if the further segment has an associated viewer importance parameter that is not higher than the viewer importance parameter associated with the first segment, then accepting delivery of of the identified first segment.

10. The client device according to claim 9, wherein the client device is configured to provide execution further comprising:
   determining the network bit rate between the server and client device;
   deciding on a proportion of the network bit rate to make available for delivery of the identified further segment; and
   determining the bit rate of the first segment and the bit rate of the further segment in dependence on the network bit rate and the proportion.

11. The client device according to claim 10, wherein determining the bit rate of the first segment and the bit rate of the further segment is further in dependence on a specified time to complete delivery of the further segment.

12. The client device according to claim 9, wherein delivering the identified first segment concurrently with the identified further segment comprises making requests for the identified first segment concurrently with the identified further segment.

13. The client device according to claim 9, wherein the information about each segment is received in a manifest file.

14. The client device according to claim 9, wherein the viewer importance parameters are derived from loudness or audio frequencies that are present in the sequence of segments.

15. The client device according to claim 9, wherein the viewer importance parameters are derived from at least one of: an amount of movement within the sequence of segments or a rate of scene changes within the sequence of segments.

16. The client device according to claim 9, wherein the viewer importance parameters are derived from a matching of pictures of the sequence of segments to a pre-determined picture.

17. A method of accepting delivery of video content at a client device from a server, said video content comprising a sequence of segments and wherein each of the segments is encoded at a plurality of bit rates, said method comprising:
   a) receiving information at the client device about each segment, wherein the information comprises the bit rates and a viewer importance parameter associated with each segment;
   b) identifying a first segment from the sequence of segments for delivery;
   c) comparing a viewer importance parameter associated with a further segment to a viewer importance parameter associated with the first segment to determine if the viewer importance parameter associated with the further segment is higher than the viewer importance parameter associated with the first segment, the further segment being after the first segment in the sequence of segments; and
   if the further segment has the associated viewer importance parameter that is higher than the viewer importance parameter associated with the first segment, then making requests for the identified first segment concurrently with the identified further segment, wherein the identified further segment is encoded at a bit rate that is equal to or higher than the identified first segment, and
   otherwise if the further segment has an associated viewer importance parameter that is not higher than the viewer importance parameter associated with the first segment, then making a request for the identified first segment.

* * * * *